United States Patent
Borowski

(10) Patent No.: US 9,516,244 B2
(45) Date of Patent: Dec. 6, 2016

(54) METHODS AND DEVICES FOR GENERATING A REPRESENTATION OF A 3D SCENE AT VERY HIGH SPEED

(75) Inventor: André Borowski, Genève (CH)

(73) Assignee: FASTREE3D S.A., Ecublens (CH)

( * ) Notice: Subject to any disclaimer, the term of this patent is extended or adjusted under 35 U.S.C. 154(b) by 248 days.

(21) Appl. No.: 13/995,654

(22) PCT Filed: Dec. 21, 2011

(86) PCT No.: PCT/EP2011/073685
§ 371 (c)(1),
(2), (4) Date: Aug. 1, 2013

(87) PCT Pub. No.: WO2012/085149
PCT Pub. Date: Jun. 28, 2012

(65) Prior Publication Data
US 2013/0300838 A1 Nov. 14, 2013

(30) Foreign Application Priority Data
Dec. 23, 2010 (EP) .................................... 10196698

(51) Int. Cl.
*H04N 5/335* (2011.01)
*G01S 7/486* (2006.01)
*G01S 17/89* (2006.01)

(52) U.S. Cl.
CPC ............... *H04N 5/335* (2013.01); *G01S 7/486* (2013.01); *G01S 7/4863* (2013.01); *G01S 7/4865* (2013.01); *G01S 7/4868* (2013.01); *G01S 17/895* (2013.01)

(58) Field of Classification Search
CPC .................... H01L 27/00–31/00; G01S 17/023
(Continued)

(56) References Cited

U.S. PATENT DOCUMENTS

| 8,217,327 B2 * | 7/2012 | Kim ........................ G01S 7/483 |
| | | 250/208.1 |
| 8,355,117 B2 * | 1/2013 | Niclass .................... G01C 3/08 |
| | | 356/3.01 |

(Continued)

OTHER PUBLICATIONS

Baiano, Alessandro, "Single Grain TFTs for High Speed Flexible Electronics", Delft University of Technology, 2009.
(Continued)

*Primary Examiner* — Luke Ratcliffe
(74) *Attorney, Agent, or Firm* — Young & Thompson

(57) ABSTRACT

The present invention relates to a 3D landscape real-time imager. It also relates to methods for operating such an imager. Such an imager comprises: —at least one illuminating part which is designed to scan at least a portion of the landscape at a given range and having an ultra-short laser pulse source emitting at least one wavelength, and an optical rotating block, with a vertical axis of rotation, and controlled such that given packets of pulses are shaped in a pattern of rotating beams sent toward the said at least partial landscape; —at least one receiving part which comprises a set of SPAD detector arrays, each arranged along a vertical direction and rotating at a given speed in synchronism with the optical rotating block of the illuminating part, the detection data of the SPAD detector arrays being combined to acquire 3D imaging data of the said at least partial landscape in a central controller.

17 Claims, 15 Drawing Sheets

(58) Field of Classification Search
USPC .............................................. 356/3.01–5.15
See application file for complete search history.

(56) References Cited

U.S. PATENT DOCUMENTS

| | | | |
|---|---|---|---|
| 2006/0192086 A1* | 8/2006 | Niclass ................. | H01L 31/107 250/214.1 |
| 2006/0202129 A1* | 9/2006 | Niclass et al. ........... | 250/370.14 |
| 2012/0162632 A1* | 6/2012 | Dutton .......................... | 356/5.01 |
| 2014/0078491 A1* | 3/2014 | Eisele et al. ................. | 356/4.07 |

OTHER PUBLICATIONS

Staszewski, Robert Bogdan, "Digital Deep-Submicron CMOS Frequency Synthesis for RF Wireless Applications", University of Texas at Dallas, 2002.

Charbon et al., "SPAD Sensors Come of Age", OPN Optics & Photonics News, pp. 34-41, 2010.

Gersbach et al., "A Low-Noise Single-Photon Detector Implemented in a 130 nm CMOS imaging process", Solid-State Electronics, 2009, vol. 53, pp. 803-808.

Girod et al., "Principles of 3D Image Analysis and Synthesis", Springer, 2002, pp. 1-12.

Itzler et al., "Geiger-mode Avalanche Photodiode Focal Plane Arrays for 3D LIDAR Imaging", Imaging and Applied Optics Technical Digest, OSA Technical Digest, 2011.

Niclass et al., "A Single Photon Avalanche Diode Array Fabricated in Deep-Submicron CMOS Technology", Proceedings of the Design Automation Test in Europe Conference, 2006, vol. 1, No. 3, pp. 1-6.

Staszewski et al., "1.3 V 20 ps Time-to-Digital Converter for Frequency Synthesis in 90-nm CMOS", IEEE Transactions on Circuits and Systems-II: Express Briefs, vol. 53, No. 3, Mar. 2006, pp. 220-224.

Staszewski et al., "All-Digital Frequency Synthesizer in Deep-Submicron CMOS", Hoboken, NJ: Wiley-Interscience, 2006, pp. 1-14.

Staszewski et al., "Event-Driven Simulation and Modeling of Phase Noise of an RF Oscillator", IEEE Transactions on Circuits and Systems-I: Regular Papers, 2005, vol. 52, No. 4, pp. 723-733.

Warburton, Ryan Ellis, "Infrared Time-Correlated Single-Photon Counting", Heriot-Watt University, 2008, pp. 1-157.

Breuckmann Scanner, Precision in 3D, AICON 3D Systems, http://www.aicon3d.com/start.html.

Marwick et al., "Fabrication and Testing of Single Photon Avalanche Detectors in the TSMC 0.18μm CMOS Technology", IEEE Information Sciences and Systems, 2007, pp. 741-744, XP031131958.

MEGAFRAME A Million Frame Per Second Camera, http://www.megaframe.eu/Contents/Publications/MEGAFRAME/FET09_MF2_poster_black_v2.pdf.

Niclass et al., "A Single Photon Detector Array with 64×64 Resolution and Millimetric Depth Accuracy for 3D Imaging", IEEE International Solid-State Circuits Conference, 2005, XP31173797.

Stettner et al., "Three Dimensional Flash Ladar Focal Planes and Time Dependent Imaging", Advanced Scientific Concepts, pp. 1-5.

Stoppa et al., "A CMOS 3-D Imager Based on Single Photon Avalanche Diode", IEEE Transactions on Circuits and Systems-I: Regular Papers, 2007, vol. 54, No. 1, XP11155729.

International Search Report, dated Feb. 9, 2012, from corresponding PCT application.

* cited by examiner

METHODS AND DEVICES FOR GENERATING A REPRESENTATION OF A 3D SCENE AT VERY HIGH SPEED

TECHNICAL FIELD

The present invention relates generally to methods and devices for generating a representation of at least one object in a 3D scene in the real word. As an example, such a scene may contain moving persons or objects in a room. The scene is illuminated with light from specific light sources. The generated electrical representation can be in the form of images of different dimensions: 1D, 2D or 3D.

More specifically, the present invention is based on SPAD (Single Photon Avalanche Diodes) devices in which a single photon can generate an electrical signal when it impinges on a photosensitive layer. Such a device is exemplified with the paper *A Single Photon Avalanche Diode Array Fabricated in Deep-Submicron CMOS Technology*, Cristiano Niclass, Maximilian Sergio, and Edoardo Charbon.

It is an object of the present invention to provide an imaging technique capable of generating a precise image of complex scenes in a faster way than with conventional imaging techniques. The method offers an improved trade-off between image depth resolution and fast data acquisition for the detection of movements.

Opto-electronic sensors according to the present invention receive reflected signals from targets which are illuminated with ultrashort light pulses and utilize the precise timing information carried by these light pulses to generate depth (relief) 3D data concerning the position and detail of the targets.

These sensors contain one or several optoelectronic chips, each containing a large number of detectors together with their auxiliary electronics. A subassembly containing a single photodetector and directly associated electronics is called a detector cell. Different arrangements and organizations of detector cells such as a matrix, rounded matrix or array (line) can be used, and additional electronic components on the sensor chip can perform additional functions on levels above the single-cell level. Many variations are possible in the shape of the detector geometry format and also in the placement of light diffusers on top of them.

BACKGROUND OF THE INVENTION

Multiple types of 3D sensors exist today. Some of them offer very high depth accuracy. They are mostly limited in terms of acquisition speed and measurement distance. They all require that no or very few light pulses are emitted before a previously emitted pulse is received and measured. This method implies a very limited acquisition speed, in particular for distant objects. This limitation arises from the need to avoid confusion between pulses "in the pipeline" as well as from the use of common optics for emission and reception of pulses. The measurement distance is also limited by the low optical power of the pulse they use to maintain eye safety. In addition, they use multiple low-power pulses separated by large time intervals and then average them over a long time in order to measure a 3D pixel. Their data throughput is not substantially enhanced due to the lack of on-chip compression capabilities.

The following methods are usually used for 3D data acquisition:

Triangulation: a triangulation 3D laser scanner is an active scanner that uses laser light to probe the environment. The triangulation laser shines a laser beam on the subject and exploits a camera to register the location of the laser dot. Depending on how far away the laser strikes a surface, the laser dot appears at different places in the camera's field of view. This technique is called triangulation because the distance is calculated based on parameters of the triangle created by the laser dot, the camera and the laser emitter;

Modulated light: modulated light 3D scanners shine light with ever changing optical power on the subject. Usually the light source simply cycles its power in a sinusoidal pattern. A camera detects the reflected light, and the amount the pattern is temporally shifted reveals the distance the light traveled. Modulated light also allows the scanner to ignore light from sources other than the laser, so there is minimal interference;

Structured light: structured-light 3D scanners project a pattern of light on the subject and register the deformation of the pattern as observed in one or several particular directions. The pattern may be one-dimensional or two-dimensional. The simplest example of a one-dimensional pattern is a line. The line is projected onto the subject using either an LCD projector or a sweeping laser beam. A camera, offset slightly from the pattern projector, registers the shape of the line and uses a technique similar to triangulation to calculate the distance of every point on the line. In the case of a single-line pattern, the line is swept across the field of view to gather distance information one strip at a time;

Time of flight: a time-of-flight 3D laser scanner is an active scanner that uses laser light to probe the subject. It measures the distance of a target point via the round-trip time of a pulse of light. A laser is used to emit a short light pulse, and a detector registers the arrival of the reflected light. Since the speed of light c is known, the round-trip time determines the travel distance of the light, which is twice the distance between the scanner and the surface. If t is the round-trip time, then distance is equal to $c*t/2$. The accuracy of a time-of-flight 3D laser scanner depends on how precisely it can measure the time delay t: 3.3 picoseconds (approx.) is the time taken for light to travel over one millimeter.

The most advanced scanning systems proposed until now (Example, Source: http://www.breuckmann.com/en/body-metrie-life-science/products/product-overview.html) do not have the capability to make very rapid 3D measurements of a scene with high depth precision. They cannot operate at long distances (more than 10 meters) and at the same time at high speed, as required, for example, to accurately image human persons walking at a normal speed. Their use would thus require that humans stop moving in order to acquire 3D data concerning their shape and position.

A paper entitled "Three Dimensional Flash Ladar Focal Planes and Time dependant Imaging-ISSSR Paper" by R. Stettner, H. Bailey, and S. Silverman describes a method of producing an image on the basis of sending flashes of laser light onto a scene. A focal plane array acquires an entire frame at each laser flash. The distance information of a dot in the scene is evaluated on the basis of the time of flight of the laser flash when it is detected at the 2D focal plane array detector. The process described in that paper appears to use APD and not SPAD, i.e., it uses analog time-of-flight measurements. Pulses with high energy pulses at 1.5 µm and a low repetition rate of 30 Hz are used. The pulse duration is not specified but is probably much longer than 1 picosecond. No use of a diffuser is described. The link between the sensors per-se and the data treatment chips is complex and difficult to industrialize.

The present invention is exemplarily based on the use of ultra-sensitive SPADs, which can be easily fabricated with a CMOS process, combined with a simple low cost germanium process. A large number of pulses are emitted toward each point on the object. This creates the advantage of a large reduction of the uncertainty of the 3D pixel position linked to the SPAD's inherent timing jitter (around 30 to 90 picoseconds for a single measurement). The duration of the pulse is preferentially chosen to be lower than the expected final uncertainty on the 3D depth, so that the pulse duration is not limiting the measurement accuracy. The required light pulses can be generated with a mode-locked laser, possibly followed by an erbium amplifier. for increasing the pulse energy.

Another paper entitled "Geiger-mode avalanche photodiode focal plane arrays for three-dimensional imaging LADAR" by Mark A. Itzler and all. also describes a method of producing an image on the basis of flashes of laser light impinging a scene. The process described in that paper uses SPAD arrays operating at 1.1 or 1.5 µm. It is essentially a single pulse (per measurement) process with time measurement based on a fast counter: "An overall 13-bit timing resolution is obtained using 11-bit pseudorandom counters with two additional Vernier bits created by using a copy of the clock with a 90 degree phase shift". No concept of using pulse trains or data compression is involved.

The typical characteristics of a commercial high quality 3D scanner (FARO LS 880 HE80) include a maximum measurement rate of 120,000 pixels/s, a laser wavelength of 785 nm, a vertical field of view 320°, a horizontal field of scan view 360°, and a linearity error of 3 mm (at 25 m and 84% reflectivity).

In some situations, the fastest 3D sensors are in fact 2D sensors (ultrafast video cameras) working in tandem in a stereoscopic arrangement in order to provide the depth information. The data throughput of the existing 3D sensors is limited by the bandwidth of the system links to the "external" world and the effective use of DSP for 2D/3D data treatment.

Very few 3D sensors are using 1.5 µm near-infrared (NIR) wavelength. These are mainly long distance rangefinders or airborne Lidar using the relatively eye-safe properties of this wavelength range (due to the absorption of the IR light in the eye's lens) to operate at very long distances (The low absorption of the atmosphere even in cloudy weather is another advantage.) They generally do not use erbium amplifiers (with their light energy storage capacity, allowing for high peak powers). This spectral region is mainly used by the telecommunication industry for fiber-optic data transmission.

Single-photon avalanche diodes (SPADs) are new detectors which are able to switch (avalanche) when receiving single photons. In the state of the art, they are implemented on silicon, and are mainly sensitive in the spectral range with wavelengths from 0.4 µm to 0.9 µm. The maximum frequency of the pulses measured by a SPAD detector is limited by its large recovery time (around 20 to 100 ns). The timing precision is limited by the intrinsic jitter, which is around 50 to 200 ps.

The development of SPAD for replacing bulky and costly photomultiplier tubes and for producing a large matrix of ultrasensitive detectors has been an ongoing process from the 1980s when S. Cova et al. developed these new silicon devices.

Recently, the MEGAFRAME European consortium was created to design SPADs with complex ancillary electronics at the pixel level. The components for one pixel comprise a SPAD and electronics for gating functionality, a time-uncorrelated photon-counting facility, and chronometer single-photon counting. The word Megaframe refers to the ambition of the project to capture more than one million images (frames) per second. An example on such a realization can be found at: http://www.megaframe.eu/Contents/Publications/MEGAFRAME/FET09_MF2_poster_black_v2.pdf Two recent reviews describe the state of the art in SPAD development: *SPAD Sensors Come of Age*, Edoardo Charbon and Silvano Donati. Optics and Photonics News, Vol. 21, Issue 2, pp. 34-41 (2010); and also *A low-noise single-photon detector implemented in a 130 nm CMOS imaging process*. Marek Gersbach, Justin Richardson, Eric Mazaleyrat, Stephane Hardillier, Cristiano Niclass, Robert Henderson, Lindsay Grant, Edoardo Charbon. Solid-State Electronics 53 (2009) 803-808.

The SPAD detectors of prior art suffered from important drawbacks. The largest matrices of SPADs detectors available today are 128 by 128 detectors due to a tradeoff between the size of the chip and the requirement of the optic which is mounted in front the SPADs detector. To reach an optimal 3D dept resolution, results of multiple time-of-flight measurements should be averaged on each SPAD detector Each SPAD diode must be connected to a time-to-digital converter (TDC). In most prior art, such TDC devices are multiplexed between the SPAD detectors. That feature does not allow high speed imaging because the SPAD detector must wait until all of the SPAD diodes have finished their multiplexed detection at the few available TDCs.

Further, in the prior art, the pulse frequency has an upper limit which is the inverse of the time of flight between the emitter, the target and the detector. This limits the measurement speed, and that limitation may prevent the measurement of moving objects in a scene at a high repetition rate as it is required for a real-time imaging service with acceptable depth resolution.

Further, in the prior art, all detection signals are transmitted to an external specialized processor, such as a digital signal processor, which is separate from the SPAD detector integrated circuit. Therefore, the throughput of the data transferred is constrained by the limited bandwidth of external (chip-to-chip) links. Internal chip links can have a much larger bandwidth and could be built in large quantities on small surface with few limitations. Existing SPAD matrix devices do not use local averaging between adjacent detectors to optimize the tradeoff between speed and sensitivity.

It appears that the state of the art of SPAD sensors is not sufficient for obtaining a representation of a scene with moving persons, for example. The frame rate would be so slow that the movement of persons with typical velocities within one frame capture period would be well above the desirable depth resolution. Also, in following the teachings of the state of the art, if the resolution of a representation, as a 2D image, is enhanced, the quantity of processed data to provide significant improvement on the clarity of an image exceeds the technical possibilities of the external (non-detector-embedded) known digital signal processing techniques. On the other hand, the speed of the process of acquiring a 2D scene, and more so, a 3D scene, in which an object is moving, is also out of the scope of the existing (non-detector-embedded) techniques.

SUMMARY OF THE INVENTION

It is an aim of the present invention to provide methods and devices that overcome the cited above limitations of the prior art.

It is also an aim of the present invention to provide a method that catches a 3D scene in a time as short as possible and without injuring effects on a human/animal target.

The present invention provides a method for producing a representation of a scene by means of a sensor array, comprising, a step of illuminating a scene by means of a series of light pulses, wherein an arrival time of each of the light pulses is measured as a timestamp.

The present invention provides for instance a method for producing a representation of a scene by means of a sensor array, comprising:

illuminating the scene by means of a series of light pulses, wherein an arrival time of each of the light pulses is measured as a timestamp;

collecting light reflected or scattered by the scene to at least a single photon avalanche diode (SPAD) sensor array comprising at least one SPAD detector cell, on the basis of the pulses from said predetermined series of light pulses such that a reference time is determined first and then the time of flight of each event detected at each SPAD detector cell is counted from the determined reference time, the said reference time being unique for at least a train of a predetermined series of light pulses;

generating 1D, 2D and/or 3D representation of the illuminated scene by processing the electrical signals generated by each SPAD detector cell on the basis of the counted time of flight of the events;

such that said representation allows to detect movements in the scene and/or to achieve high resolution 1D, 2D and/or 3D images.

Different exemplary ways for implementing the invention are defined for instance in the claims and sub-claims.

For instance, the step of illuminating the scene comprises:

continuously optimizing the pulse power and the number of pulses on each particular target in the scene to keep with a human/animal safety strategy in generating said light pulses with high peak ratio, and/or high peak power pulse trains, by managing the peak and total energy, repetition rate and silent times aimed on each individual target during a given time unit;

continuously optimizing light parameters comprising power and duration of each pulse train for a sequence of light pulses according to optical criteria related to said SPAD sensor array; and/or optimizing the result of both above strategies in view of generating an electric signal with maximum resolution representing the illuminated scene.

In an aspect of the present invention, the duration of each pulse is preferably shorter than an expected timing/depth resolution. Each pulse of at least a given series is temporally related to the others. A delay between pulses is preferably shorter than the round trip time of flight between sensor and target.

An important aspect of the invention is the use of pulse trains instead of single pulses. According to previously used methods, one would normally require a large temporal spacing of multiple pulses in order to avoid any confusion of signals from these pulses. However, this invention contains the use of a progressive scanning technique. Here, one exploits already existing information (from previous measurements, possibly made with conventional time-of-flight methods), which allows one to apply a large number of pulses with a rather short temporal spacing (even far below the round-trip time between sender and receiver). Normally, there would be an ambiguity, since it would not be clear from which pulse a received signal originates. With the approximate distance being known already, however, the data processing circuits can determine from which pulse a particular photon count results, and use its precise timing to further increase the measurement precision. Also, the number of random false counts can be reduced substantially by blanking techniques, i.e., by deactivating the photon detector at times where no real signal can occur.

The improvement in precision and speed from the use of train of closely spaced pulses would be meaningless if the pulses would not be highly coherent (inside a pulse train) in their timing and of sufficient peak power to have a high probability of detection. The use of mode locked laser pulse generators and erbium amplifier is a significant advantage of the proposed solution The pulse spacing in the used pulse trains would normally be limited by the recovery time of the SPADs. (After a SPAD has been triggered, it cannot receive further signals within a recovery time of the order of 20 ns.) However, this limitation can also be eliminated by using multiple SPADs in parallel in combination with a diffuser, which distributes the received light to these SPADs. Even if some of the SPADs have been triggered already, the remaining SPADs can still receive light. The diffuser will statistically distribute the photons on different SPADs, so that there is at least a substantial probability that further photons hit SPADs which have not been triggered yet. In that way, the pulse spacing in the pulse trains can be reduced to values even well below the SPAD recovery time.

A variant of the diffuser technique is to instead use pulses with different wavelengths in combination with wavelength-specific detectors (using bandpass filters, for example). This allows the use of shorter effective pulse spacing, because subsequent pulses can have different wavelengths, and each single detector has to deal only with a subset of the pulses, leading to larger pulse spacing for each single detector. Detectors for different wavelengths could be placed either on a single detector chip or on different chips, even on different sensor arrangements.

Note that the methods described above generate a large amount of data, which may be difficult to process and transmit. Therefore, it is also proposed to reduce the amount of data with processing on the chip, beginning with the electronics associated with each detector pixel. For example, such local electronics can average time data from subsequent pulses in order to increase the precision, or to eliminate false counts by comparing data from different pulses. Also, on-chip electronics can filter and compress the data before transmitting it.

The described methods show how to strongly reduce the measurement time for precise determination of the object distance and relief data. In that way, it becomes possible to operate with moving objects, for example.

The ultimate depth resolution of an imager using the techniques here described is limited by at least two factors:

the ultra-short light pulse duration and jitter should be in the few pico-seconds range to allow a resolution in the millimeter range for each detected photon returning from the target to the SPAD detector and, each SPAD and associated Time to Digital converter should have a resolution/precision also in the few pico-seconds range to allow a resolution in the millimeter range for each pulse.

Both (few pico-seconds) requirements could be relaxed while achieving the millimeter resolution target if we consider a complete train of pulse or a group of train of pulses. The statistical averaging of accumulated time of flight measurement for the same target point (supposed not moving during the measurement) brings resolution by lowering the uncertainty proportionally to the square root of the number of coherently detected pulses from a pulse train having a precise timing between themselves with low variations. The requirement in duration of the pulse and SPAD resolution is then moved in the tens of pico-seconds range for pulse trains of hundreds to thousands of pulses.

Further relaxation of both requirements is achievable by averaging for the same pixels between succeeding pulse trains and also by averaging between neighboring pixels in the same array.

It is another object of the present invention to provide a method for making a SPAD detector array to be used in the method as defined above, said method comprising the steps of:
  making a first layer comprising a substrate; and then
  making a second SPAD sensor layer comprising a plurality of single SPAD cells, at least some SPAD cells having also local analog and/or timing signal processing and also digital signal processing.
  This method can be applied to detectors which are sensitive for light with wavelength around 1.5 µm, for example, allowing the use in relatively eye-safe devices.

It is another object of the present invention to describe a single photon avalanche diode detector (SPAD) array which can be used for producing a representation of a scene of a given world and/or a method for making a SPAD detector array according to the present invention. The invented SPAD detector array comprises at least a SPAD detector cell having at least a SPAD diode and further comprising at least one of the following devices:
  a quenching circuit;
  a pulse conditioner;
  at least a time to digital converter;
  a local (i.e., close to the detector) digital signal processor, with several subcomponents like:
  a blanking circuit controlled by said local digital signal processor;
  a statistical processing circuit comprising at least one counter of the detected events at the SPAD diode, and a D-latch and a multiplier connected to an inverse calculus and eventually to a local correcting circuit;
  a digital time and/or space averaging circuit;
  a digital nonlinear averaging circuit.
  a smart bias correction circuit using data received from the global DSP.

It is another object of the present invention to describe a device for the representation of a scene of a real world. The invented device comprises:
  at least one device for illuminating said scene providing at least a series of ultrashort laser pulses with time-related positions under control of its proper controller, the illuminating device comprising preferably a locked-mode laser source connected to a Erbium-doped optical fiber amplifier; and
  at least a Single Photon Avalanche Diode detector array according to the present invention and associated with at least said series of ultrashort power laser pulses of said illuminator.

A mode-locked laser appears to be a particularly suitable implementation for the pulse source, as it naturally guarantees a very high timing precision.

Also, SPADs are a particularly suitable type of detector, since they have an extremely high sensitivity on the single-photon level, and a high speed. Also, they can be stacked with high density on a detector chip. However, it is well possible to implement the described methods with other kinds of light sources and of detectors, such as high-gain avalanche diodes.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION

System of Acquiring a Scene

Figure 1:
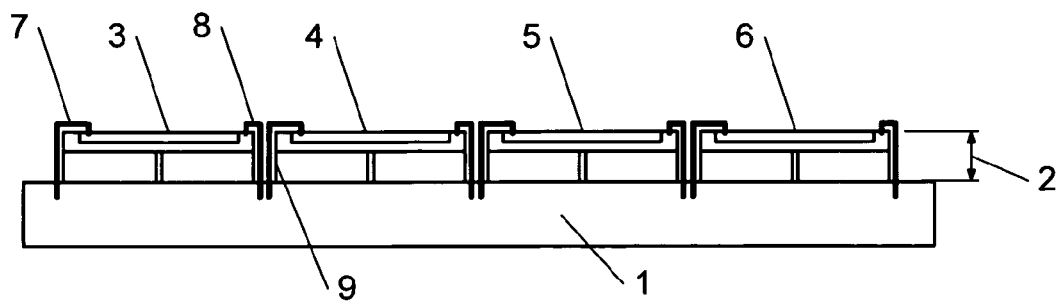
FIG. 1 illustrates a germanium SPAD sensor array operating at 1.5 µm wavelength as a first embodiment of the present invention.

First, a description of a system for generating a representation of a scene according to an embodiment of the present invention is given.

Such a system comprises:
- a laser source as an illuminating device; and
- a SPAD sensor array, preferably mounted with optics to collate the photons reflected by the scene.

In another embodiment, more than one laser source is combined in the illuminating device. Each laser source is possibly built to operate at a given wavelength. Another embodiment uses coordinated time-optimized pulses.

In another embodiment, several SPAD sensor matrices are combined to form a scene detector.

The optics of both the light source and the scene detector are built to optimize the collection of photons on the SPADs detector array. Some details are given below. However, a person skilled in the art is familiar the optical setup required to use for this purpose.

The light directed toward the scene has been spatially shaped by the optical components of the illuminating device. Various patterns are programmed in a program memory to control the optical means to ensure a predetermined shape of the light rays illuminating the scene: dot, line, band, etc. Moreover, the lighted part of the scene can be moved according to a predetermined movement which is initially programmed onto a program memory to control the optical means to ensure a moving illuminated zone of the scene.

In another embodiment, the illuminating device illuminates a static zone of the scene. The optics mounted in front of the SPAD sensor array, and/or on the SPAD sensor array itself, can contain moving parts in order to generate a predetermined movement of the optical image of the illuminated zone of the scene according to a predetermined movement which is initially programmed onto a program memory to control the optical means of said SPAD sensor array to create a moving illuminated zone of the scene.

The optical means of the light source and/or the optics associated with the SPAD sensor array comprise mirrors, prisms, lenses, mobile lenses, collimator, etc.

An embodiment of a light source used as an illuminating device according to the present invention comprises a mode-locked laser source optically coupled through an electronically controlled modulator to an optical power amplifier. Such a power optical amplifier is based on an optical fiber made of glass doped with erbium or some other rare earth material used to amplify the light in the near infrared range, namely around 1500 nm. Such a spectral region is selected as part of a human safety strategy to illuminate a scene containing human beings. It is essential in such situations to select wavelengths in a range which is safe to the eyes of the persons which can be targeted by the illuminating device. The ultrashort power laser pulses are arranged in programmed series of pulses by the control of the modulator at the output of the locked-mode laser source. A controller is dedicated in the illuminating device to prepare such a series or train of pulses. Two different strategies of illuminating a scene are applied according to the invention. First, a low resolution strategy is used to acquire a representation at a low resolution. A low resolution frame is then acquired by the SPAD sensor array and then a second step follows as will be described later. In the second step, a full resolution is sought. Another larger series of pulses is going through the modulator interposed between the locked-mode laser and its power amplifier In a non-starved photon regime, at least one photon of each light pulse generated at an output port of the illuminating device impinges a SPAD cell of the SPAD sensor array after passing through the scene. The signals of a representation of the illuminated scene are generated by averaging the measured time relations of successive pulses of a given sequence. Two mechanisms to provide time-related pulses are explained in the present invention and will be more completely discussed below:
- simple pulse trains of limited total duration (minimum total optical energy on the target, minimum movement of the target) where the constant pulse spacing is the main parameter controlled by the controller of the illuminating device;
- signature method in which each pulse train comprises at least another detectable parameter like relative amplitude and/or removing some pulse(s) in the train and/or time period and/or slightly varying wavelength from the other pulses of a same sequence of light pulses.

According to the invention, such methods are preferred to the state of the art methods, where the pulse spacing is limited by the round-trip time. Such a strategy to generate sequences of light pulses is determined according to the present invention both by optical constraints of the SPAD sensor array which is used and by human safety constraints.

Optical constraints of the SPAD sensor array comprise the repetition of the detection of photons from a single part of the scene to be represented. Such a repetition must be made at high frequency (for a low total duration of illumination) to allow the detection of movements in the scene and at sufficiently high optical power to ensure the detection of distant details in the scene.

Human safety constraints include the received energy by the human eye, the wavelength of the impinging light and the total duration (averaged for a second) of the illumination of the human eye.

Method of Producing a Representation of a Scene

The method of the present invention can be used to generate a representation of a scene. As an example, such a scene contains some human persons, and some biometric parameters of the faces may be of interest for face recognition. Such a representation of a scene comprises a plurality of lists containing coordinate-related information pieces from each reflecting dot of objects in the scene. Such coordinate-related information comprises data which are obtained on the basis of the reflected light and of the knowing of the direction of the ultrashort power laser beams which are directed to the scene with an illuminator. A time-of-flight is measured for each pulse and/or packet of pulses onto at least a SPAD sensor array. Therefore, a 3D-coordinate of each reflecting dot in the scene can be deduced onto the collected data from the invented SPAD sensor array. Applications of such a method are described in the co-pending patent applications from the same applicant which are entitled "2D/3D Real-Time Imager and Corresponding Imaging Methods" and "3D Landscape Real-Time Imager and method for operating such an imager" and are filed the same day. It is noted that the representation of the scene is not exactly a 3D image of the scene. But, it is possible to derive a 1D-, a 2D- and/or a 3D-image, a 3D video sequence; a 3D-CAD model or the like. The invented method comprises the following steps:

illuminating the scene by means of a predetermined train of ultra-high peak power (in a sense approaching a Dirac delta function), ultrashort light pulses;

collecting light reflected or scattered by the scene onto at least one SPAD sensor array which comprises at least one SPAD sensor cell;

generating an electrical signal representing the illuminated scene by processing the electrical signal generated by each SPAD sensor cell onto a local processor such that said signal is preferably time-to-digital converted, then filtered, then averaged, freed from its jitter, bias removed, possibly inter-detector averaged, and then data compressed, such that said representation is able to detect movements in the scene and/or high resolution imaging.

Single pulses are used in some special cases to illuminate some parts of a scene.

The step of illuminating the scene comprises a step of constantly optimizing the emission pulse power on each particular target in the scene. Such a step allows to keep with a human safety strategy. In an embodiment a human safety strategy comprises generating the power ultrashort light pulses with high peak ratio, and/or high peak power pulse trains, by managing the peak and total energy, repetition rate and silent times aimed on each individual (potentially human) target during a given time unit;

The step of illuminating the scene comprises also a step of computing light parameters comprising power and duration and therefore the energy, of each pulse train for a sequence of light pulses according to optical criteria related to said SPAD sensor array.

The step of illuminating the scene comprises an optimization of the pulse launching parameters in view of generating an electric signal representing the illuminated scene with maximum resolution.

The step of generating 1D, 2D and/or 3D representation of the illuminated scene comprises a step of detecting time-related information of each said received pulses by measuring first a fast clock at some received pulses with at least at a SPAD detector cell to obtain a coarse value of a time-related information. Such a coarse value is obtained by running a counter and a fast clock as it will be discussed below. The timestamp starts at a value which corresponds with a reference time like the emission of a first pulse of a train or packet of illuminating ultrashort power light pulses. In a further step, a time to digital converting process is running to obtain a fine value of a time-related information. Finally, a step of combining said coarse and fine values of a time-related information is performed to obtain a time-related information of the time of flight of at least a received ultrashort power light pulse from the scene. Such a time-related information is called a timestamp which measures precisely the time-of flight from at least a pixel of the illuminated scene. The combined knowledge of the exact angular direction of the laser beam, of the position of the receiver having the SPAD detector array, and of the address of the SPAD detector cell on which the event is analyzed, allows the computation of a 1D, 2D or 3D coordinates of the reflective target pixel of the scene.

The time to digital converting process is a based on a method, which uses a lot of D-latches for which the rise time is not identically distributed. Therefore, it is possible to classify the speed of each D-latch of a time to data converter which is built onto the same integrated circuit part than a given SPAD detector cell as it will be discussed below. Such a distribution comes from the differences in the making of the integrated circuit on which a TDC circuit is built. The differences between the various rise times of the D-latches are very fine, which allows a fine evaluation of the time of an event is detected onto a SPAD detector cell as it will be discussed below.

A paper of R. B. Staszewski et al, "1.3 V 20 ps time-to-digital converter for frequency synthesis in 90 nm CMOS", IEEE Trans. On Circuits and Systems II, vol. 53, no. 3, pp. 220-224, March 2006 is published on the matter of the time to digital converting process.

After the ultrashort light pulses are reflected at an illuminating device with a given direction or plurality of directions, the reflected photons of the scene are received onto the receiving device comprising at least a SPAD detector array. The received pulses are registered by at least one SPAD detector cell and/or a plurality of said SPAD detector cells at one time or at different times.

In an embodiment, the generating step of the illuminating series of ultrashort power light pulses comprises a step of acquiring 3D data from light pulses launched on a target at a frequency larger than the usual time-of-flight limitations based on filtering capabilities made possible by a progressive acquisition strategy and/or in determining the target distance.

A global timestamp for each detected event on at least a SPAD detector cell is used on a frame of the pulsed train instead of individual Ton–Toff delay for each pulse.

A variable number of pulses for each measurement pulse train, this number being optimized considering the speed of measurement and the obtained image resolution while keeping the involved optical energy low enough for obtaining eye safety.

As a reflected photon from the scene impinges the photodiode of a SPAD detector cell, an event is generated and then, it is performed a filtering step of the events detected at each SPAD diode.

A step of normalizing the detected time-related data from the TDCs of each SPAD detector cell on the basis of a calibration PVT process is also performed.

As a strategy of control of the illuminating device, a non-blanking acquisition step uses a discovery frame. Instead of a discovery frame, some illuminating pulses at a first resolution, is followed by at least a blanking acquisition step which uses a measurement frame and/or train of illuminating pulses at a second resolution higher than the first resolution and applied upon at least one SPAD detector cell. Such a step allows the scanning at a progressive resolution enhancement. The following acquisition at a higher resolution is performed with the knowing of the intermediate pixels already acquired at a lower resolution.

An averaging step in space and/or in time is performed onto the time-related data from the time to digital TDCs processes or of at least some of the SPAD diodes. Such an averaging step is performed locally close to the SPAD detector cell.

Having generated at least one packet of a given number of illuminating laser pulses, a step of averaging, notably under a square law, the received packets at least upon one SPAD is performed.

A step of compressing of the time data before further processing, locally close to the SPAD detector.

A step of correcting the local data of said compressed time-related data is also performed as it will be discussed later.

A step of generating a clock and power enabling signal, on the basis of a first coarse scanning, by an illuminating device to activate at least one SPAD detector cell at the just-in-time arrival of a packet of received laser pulses.

A step of generating a series of laser pulses arranged in tagged packets of pulses and detecting tags on said received light pulses in SPAD detector cells is performed.

In an embodiment, the receiver which comprises at least a SPAD detector array having at least a SPAD detector cell comprises optics for collecting the reflected pulses form the illuminated scene. In the optics a mechanism is designed for rotating at various angles the image of the scene on the SPAD detector array and accumulating the received photons at the SPAD detector array positions related to the source physical address of a given pixel of the scene.

In another embodiment, a step of accumulating the same target pixel photon value onto a circular memory is performed.

A step of detecting and/or filtering of the time and depth values from at least one pixel of the scene from different pulses diffused toward available SPAD detector cells is also performed. It is noticeable that a SPAD diode has a recovery time after a photon has been avalanched on it. Therefore such a SPAD detector cell is not available before a recovery time. A controller is programmed to disable the avalanched SPAD detector cell.

A step of acquiring the same approximate pixel address in the scene on the basis of at least two wavelengths reaching successively different wavelength-filtered SPAD detectors within a time which is shorter than a single SPAD's recovery time is also performed.

A step of acquiring non-repetitive signals at without being limited by the single SPAD detector recovery time by using the global SPAD detector array and optical distribution systems is performed.

In an embodiment, it is acquired illuminated lines of the scene. To this end, the illuminating device comprises a beam forming device which is designed to direct a line of illuminating the scene at various angles.

In such an embodiment, it is also performed a step of acquiring illuminated lines of the scene on a single line focal point, then diffused onto multiple SPAD detector arrays and then accumulating/averaging the detected time-related data to generate a composite pixel in a purely digital way.

In another embodiment, a Just-in-time powering and clocking of SPAD for power saving is performed as it will be discussed below.

Method of Making SPAD Sensor Arrays

The present invention contains a special multi-material technology for fabricating semiconductor chips containing imaging SPAD multi-detectors which are suitable for operation at 1.5-μm NIR (Near-Infra-Red) eye-safe wavelengths. This technology allows for the use of advanced CMOS chips manufactured with the most advanced (and largely available) technology. A core feature is the deposition of the layer which is photosensitive at 1.5 μm wavelength (whereas silicon is not sensitive to 1.5 μm NIR) with another independent low-temperature process compatible with CMOS, on top of a CMOS chip. Other processes, not requiring this additional deposition, are possible but probably less efficient.

In FIG. 1, a SPAD sensor array based upon a germanium photodetector sensitive at 1.5 μm wavelength is represented in a global view. The sensor array 1-9 comprises a substrate 1 as a first layer, which can be built in a first step of the fabrication process. In a preferred embodiment of the present invention, such a substrate is at least partially made of an integrated CMOS circuit or of an array of a plurality of integrated CMOS circuits, conveniently interconnected as it is described below. Such a plurality of integrated CMOS circuits can be implemented on a single large wafer according to well known methods of CMOS IC making.

In a second step of the fabrication process, which can be performed in another plant and at other times, a second photosensitive layer 2 under a thin film can be made. In a preferred embodiment of the present invention, said photosensitive layer 2 is associated with at least one SPAD sensor cell. In the example shown in FIG. 1, four SPAD sensor cells 3-6 are built on the same first CMOS IC 1. Each SPAD sensor cell comprises a silicon dioxide $SiO_2$ layer in which a central hole is made as it will be discussed below. Then a photosensitive layer is deposited at the top of the $SiO_2$ field. The photosensitive layer is contacted to the CMOS IC layer 1 by means of electrical contacts 7 and 8 which pass through trenches or bores 9 built between the SPAD sensor cells.

In a preferred embodiment of the present invention, the photosensitive layer 2 is made of a thin film of germanium. Such a semiconductor body is selected due to its photosensitive properties in the range around 1500 nm of wavelengths. Such wavelengths at the near infrared allow for a human safety strategy as it has still been exposed. Unfortunately, such a technology of implementing an additional photosensitive layer made in germanium on top of complete CMOS is not known before the time of the invention for an imaging SPAD. Therefore, the inventors have designed a new process able to fabricate a single photon avalanche diode, demonstrating the feasibility of SPAD sensor cells and of SPAD sensor arrays as required for the devices of the present invention. At the beginning of the deposition of the photosensitive layer 2, there is the choice of the so-called μ-Czochralski method by the inventors.

The μ-Czochralski method is a low-cost low-temperature fabrication process that could be used on top of an advanced CMOS chip as a post-processing step in a different (i.e., less advanced) fabrication facility. This way, the dense and fast processing electronics are made using conventional digital CMOS technology, whereas the SPAD detector itself is implemented with optimized and dedicated germanium structures. The size of the detector is selected to be similar to the size of the corresponding pixel electronics, so that they are stacked. In that way, large pixel arrays can be made where most of the surface area is photosensitive.

In an embodiment of the present invention, as illustrated in FIG. 1, the SPAD sensor array is under a pseudo-linear shape. In other embodiments, the SPAD sensor array is designed as a 2D architecture, each SPAD sensor cell having a geometric shape designed to be jointly contacted with its neighbors. In a preferred embodiment, each SPAD sensor cell is a square cell.

Figure 2:
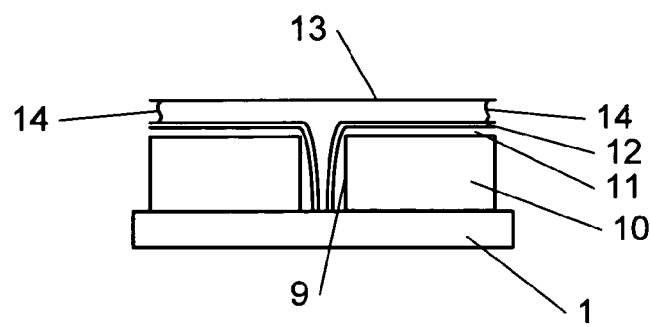
FIG. 2 illustrates a deposition process of the germanium SPAD sensor array at 1.5 µm wavelength in an embodiment of the present invention.

In FIG. 2, the state of an integrated circuit after a deposition process for a germanium SPAD sensor at 1.5 μm wavelength is illustrated.

A central hole 9 is made through the $SiO_2$ layer 10 at each active part of a SPAD sensor cell. These 1-μm holes 9 are created at the expected pixel locations. A layer of tetraethyl orthosilicate (TEOS) 11 and then a layer of $Al_2O_3$ 12 are deposited. An amorphous germanium 13 is sputtered at 550° C. and crystallized by excimer laser. Single germanium grains as large as 9 μm in diameter have been grown routinely with this method. The small thickness of only 200 nm appears problematic for IR detection, which typically requires 4 μm for good efficiency. The 200 nm nominal thickness has been experimentally increased to 600 nm, but it would be difficult to make it much thicker. According to the present invention, it is proposed to use cavity 9 to capture the incoming photons such that they are reflected several times before being absorbed. Therefore, the central hole 9 is designed such that its height and its diameter ensure a good capacity in capturing incoming photons. The $Al_2O_3$ layer 12 follows the wall of the central hole 9 such that the germanium body grain occupies entirely the height of the bore in the best situation. That central hole feature can be used in combination with a range of thickness values of the germanium layer, ranging from 200 to 600 nm, whereas the infrared wavelength normally requires 4 µm for efficient absorption. An advantage of the present invention is to combine both features although one of them is not convenient for an infrared detector.

Figure 3:
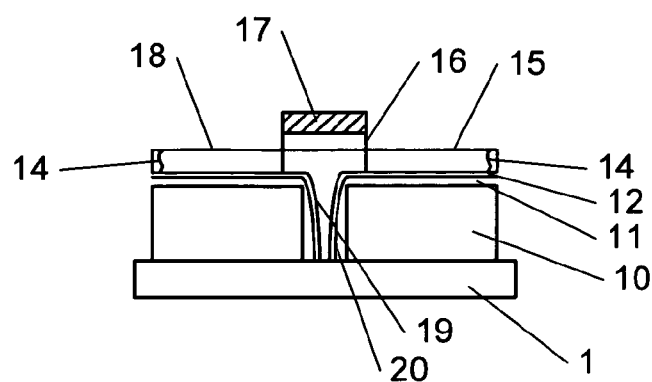
FIG. 3 illustrates how a transistor is created in a germanium SPAD sensor array at 1.5 µm wavelength in an embodiment of the present invention.

FIG. 3 illustrates a transistor as can be made in a germanium SPAD sensor cell which is sensitive at 1.5 µm wavelength. As it is explained below, the present invention involves the use of fast signal processing at the SPAD sensor cell level in order to facilitate fast generation of a representation of a scene with a high resolution SPAD sensor array. An advantage of such a technical solution is to allow the processing of the electrical signal produced with the single photon avalanche diode itself at a location close to the SPAD sensor array. Otherwise, one would require routing of the signals generated at the photodiodes to a big array, which is increase significantly the latency and limit bandwidth.

As it has been explained in FIG. 2, the germanium body is grown on the top of each cell to obtain a single grain for each active part of the cell. Such germanium grains have been used for pseudo P-MOS and N-MOS transistors, as shown in FIG. 3. Since the original application is different and the pseudo MOS devices are not needed here, some of the fabrication steps would need to be slightly modified.

After the deposition process of FIG. 2 has been completed, an p+/n+ doped region 15 is implemented at a drain connection D and a p+/n+ doped region is implemented at a source connection S at two sides of a channel region 16 deposited between a metal connection pad for a gate G 17 and the germanium body itself.

Figure 4:
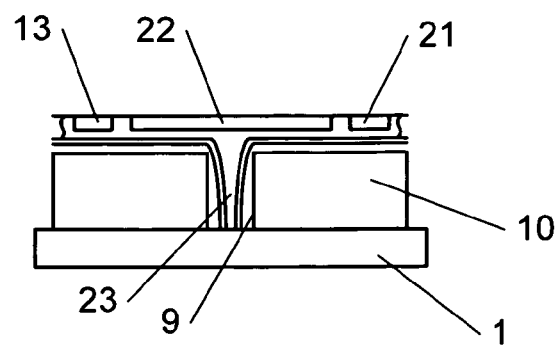
FIG. 4 illustrates a method of creating a photodiode on a germanium SPAD sensor array at 1.5 µm wavelength in an embodiment of the present invention.

In FIG. 4, the state of an integrated circuit at a step of a photodiode creation process in a germanium SPAD detector array at 1.5 µm wavelength is illustrated. A reference is made to a published document, by A. Baiano "Single Grain TFTs for High Speed Flexible Electronics" (PhD Thesis) TUD Technische Universiteit Delft (143 pag.).

The germanium layer needs to be diffused to create a vertical p-n junction. With contacts added, this will result in a photodiode. The depletion layer runs quite deep. It is noted that the central hole 9 works as a photon capturing cavity. Its horizontal and/or vertical dimensions are selected to enhance the capability of the central hole to capture a single photon although the small thickness of the Ge layer would normally not be well suited for the detection of 1.5-µm light.

After the deposition process leading to the structure of FIG. 2 has been completed, further structures as shown in FIG. 4 are added. An n+/p+ doped region 22 is implanted above the central hole 9, and a contact for an anode A of the SPAD diode is made. At the same time, a ring electrode 21 of a cathode C is implanted around the anode zone 22. An application of such a method has been detailed in Baiano A., Single Grain TFTs for High Speed Flexible Electronics (PhD Thesis), TUD Technische Universiteit Delft (143 pages.)

In an embodiment of the present invention not illustrated here, a selective and/or a global optical diffuser is mounted on top of the detecting areas of the SPAD sensor array to improve strongly the equivalent minimum recovery delay capability of a group of SPAD detectors. The principle behind that improvement is explained in the following. Due to the diffuser, incoming photons are randomly sent to different detector elements. Once a photon has been registered, the corresponding element will have a relatively long dead time of 20 ns, for example. However, a further photon is likely to hit some of the other detector elements, which are still ready for detection. In that way, photons can be registered at a much higher rate than the inverse dead time of a single detector element.

In an embodiment of the present invention, a rounded arrangement (see FIG. 5) for a matrix form of SPAD (or any sensor) is designed. This optional geometrical placement of detectors on the sensor surface allows the rotation of the target image by an optical system like a rotating mirror in the receiving optics, while avoiding any image clipping effects. The method of acquiring a representation of a scene comprises a first step to acquire a first image and then a second step in which the target image is rotated by a given angular step. The process of acquiring a representation of a scene is rapidly repeated for each angular change movement. It is understood that at each step of acquiring an image at a given angular step, the illuminating device, generates at least a sequence of ultrashort power pulses in a given time relation as it will be seen below. The SPAD sensor array 30 is able to accumulate the acquired data from each SPAD sensor cell to generate a high performance representation of the illuminated scene.

Figure 5:
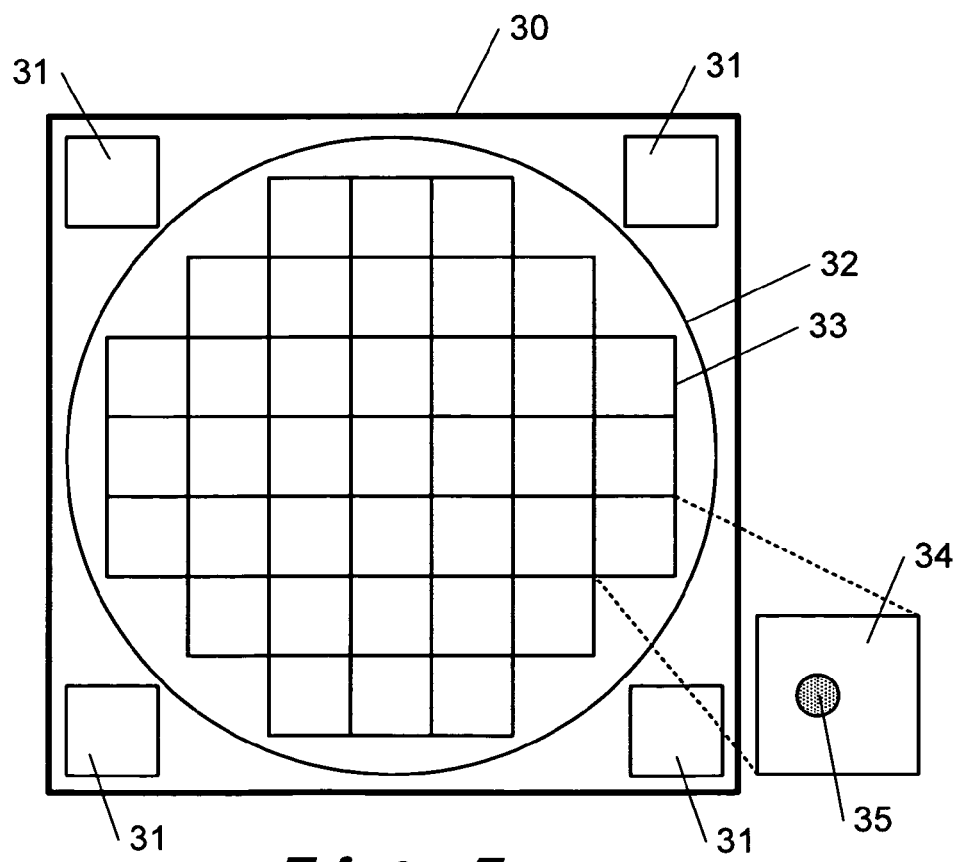
FIG. 5 illustrates a rounded placement of detectors and global DSP on chip surface.

In FIG. 5, a rounded placement of SPAD sensor array is freeing space for some parts of an on-chip global DSP Digital Signal Processor.

The SPAD sensor array is built upon a squared wafer. At the four corners of the square 30 a global DSP Digital Signal Processor 31 is implemented mainly on a first CMOS die at the top of which a second photosensitive layer is deposited at its turn, as it has been described in FIGS. 1 to 4.

A rounded region 32 is build around a center of the SPAD sensor array 30 which is made of a plurality of SPAD sensor cells, like the SPAD sensor cell 33. At the right side of FIG. 5, a single SPAD sensor cell has been detailed.

At a given location of the SPAD sensor cell, a SPAD diode 35 is implemented, as it has been described in FIG. 4. On the remaining 34 of the surface of the SPAD sensor cell, a local signal processor is embedded, as it has been described in FIG. 4.

According to an important aspect of the present invention, the SPAD sensor array comprises two kind of DSP processors:

a type of global processor; and
a type of local processor (cell and macro-cells).

The local DSP processors are mainly embedded onto each SPAD sensor cell, and/or as it is described later, at a group of SPAD detector cells level. A local DSP processor is placed on the substrate layer of the CMOS IC at the same time as the SPAD diode itself. Each local DSP is clustered with groups of local DSP onto one or several links for data communications with the exterior of the CMOS IC, mainly for sending data to the Global DSP. Each local processor runs at least one program which computes data available at the closest distance of the local DSP processor. In that way, the time for processing a set of data is reduced. In contrast, the use of a central processor would require transmitting a lot of data and therefore too much time to process such real-time images.

The global DSPs are mainly placed on the corners of the SPAD detector array, i.e., outside the rounded optical part. The global DSPs are connected to the local DSPs and consolidate, compress and/or compile the data acquired from the programs running at the local DSP level. Their main function is to transfer the 3D data to the outside world. They are also responsible to "feed-back" the local DSP with the required data needed for the acquisition (blanking/filtering) and treatment of the 3D data.

In another embodiment, a large improvement has been made in the maximum equivalent frequency of the pulses detected (i.e., detector availability rate) inside some "diffuser groups". A diffuser group is made of a set of SPAD sensor cells under a common diffuser. Such a technical feature is offered while keeping a very high sensitivity level. It is more clearly described below.

In another embodiment, the use of timestamps instead of multiple individual $T_{on}$-$T_{off}$ timing data, fully utilizes the capability of a low-jitter mode-locked laser illuminating device. This advantage is linked to the use of mode-locked pulse lasers having an intrinsically low long term (i.e., more than one millisecond) timing jitter. These low jitter characteristics are important when working with several pulses "in the pipe" to guarantee their common low jitter emission timing. It allows the treatment of all the pulses "in the pipe" and provides improved performance in the pulse time data filtering and compression.

Each SPAD sensor cell uses an individual time-to-digital converter (TDC) and individual local data processing blocks (within each cell). These TDCs will provide high resolution measurements based on inverter-chain delays. The TDC uses a global reference timing signal provided centrally for the duration of a complete frame.

According to another important feature of the present invention, a frame has two formats. A frame is a pulse train of limited duration, tightly synchronized between themselves with a constant interval between pulses, safe for the frame tagging. In an embodiment, the tagging of the pulses is made by modulating pulses in the train and/or removing a given number of pulses in the train to encode a value of N missing pulses which are recognized at the receiving device. Special pulses are built with a given amplitude and/or frequency and/or duration. The complete frame is first built by the illuminating device, to generate the illumination of the scene to image. The recovery of the whole frame timing data is made at the acquisition device to generate a representation of the illuminated scene. Therefore, the frame depends of the scanning mode of the scene. In an example, a first frame is generated at a first rate (rough distance discovery). Therefore, the illuminating device generates trains of light pulses at a moderate rate because the minimization of pulse delay is not possible before a rough 3D data is available. The first exploratory frame is received at the SPAD detector array and the illuminated dots of the scene are processed to create a quick/rough meshing 3D model of the scene. The time-related information associated with each emitted pulse is treated at the local DSP level to obtain depth information of the related target points of the scene.

The first frame is expected to be of limited duration (low number of pulses). Its main purpose is to catch the outline of the targets, detect safety issues (unexpected human presence) and allow optimal emission of further measurement frames. Another solution is using optical focusing to predetermine the target distance. Knowledge of the outline of the area around the sensor (by any means) is another way to shorten/suppress the discovery (rough target outline) phase. After that, some parts of the reconstructed scene are more precisely scanned at a higher rate (more pulse, better precision). The method can be repeated at different rates, and for different parts or orientations of the detector. Therefore, a frame according to the present invention is defined both with generation of trains of laser pulses at different locations and/or orientations toward at least a target in the illuminated scene, and with a sequence of orientations and/or positions of the SPAD detector array synchronized on the trains of laser pulses generated. To allow an efficient measurement of the target point depth, time-related information is acquired by each SPAD cell on the SPAD array of the receiving part.

TDCs will not preferably use a start-stop measurement based on each laser pulse, but a per frame global timestamp based on a start of frame measurement created by the system that will generally start with the first pulse and end around 1 μs after the last pulse emitted. The zero time of the timestamp could advantageously be placed just before the expected first return pulse detection.

Such a circuit can be designed along with the learning of the present specification and also in R. B. Staszewski, S. Vemulapalli, P. Vallur, J. Wallberg, and P. T. Balsara, "1.3 V 20 ps time-to-digital converter for frequency synthesis in 90-nm CMOS," IEEE Trans. on Circuits and Systems II, vol. 53, no. 3, pp. 220-224, March 2006; R. B. Staszewski, C. Fernando, and P. T. Balsara, "Event-driven simulation and modeling of phase noise of an RF oscillator," IEEE Trans. on Circuits and Systems I, vol. 52, no. 4, pp. 723-733, April 2005; and R. B. Staszewski and P. T. Balsara, All-Digital Frequency Synthesizer in Deep-Submicron CMOS, New Jersey: John Wiley & Sons, Inc., September 2006.

Further benefits of a timestamp approach as designed in the present invention are derived by using power-of-two of units of separation between pulses, as well as the power-of-two number of pulses.

According to a main feature of the invention, a local statistical processing is provided to enhance the effective signal received from the SPAD sensor cells. In an embodiment of the present invention, such a statistical processing is based upon a digital averaging of a series of received pulses, when they are received and time converted as it is known from the state of the art. After being time converted, the received pulses exact timing is measured and averaged. In that view, the invention provides a means for preparing the data to be processed.

For example, if the emitted pulses are spaced by 32 unit intervals (i.e., the 100-ps clock period), then the averaging can be simplified by simply dropping the MSB bits of 32 and higher weights and accumulating the remainders. If, in addition, there are power-of-two based number of pulses, then the division can be replaced with a simple right-bit-shift operation.

Figure 6:
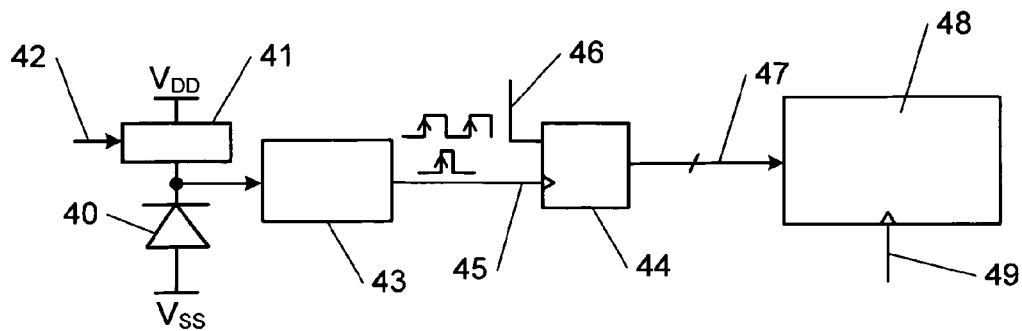
FIG. 6 illustrates a normalizing TDC PVT.

In FIG. 6, a part of a local signal processor on a SPAD sensor with its accompanying cell from the SPAD sensor array is described. The SPAD diode 40 is biased between two voltage lines $V_{dd}$ and $V_{ss}$ distributed at least on the photosensitive part of the SPAD sensor array. According to the normal operation of the SPAD, a quenching circuit 41 is provided which recovers the SPAD by bringing it to the breakdown voltage after a single photon is captured at the SPAD 40. During the relaxation time, no other photon can be registered.

The quenching circuit 41 can be passive or can be activated upon an active process 42 as it is well known in the art. When a breakdown current is generated at the SPAD 40, a voltage change appears at the cathode node which is connected to the input of a pulse conditioning circuit 43. Such a pulse conditioning device is well known in the art and allows a regular pulse to be generated for each breakdown of the SPAD diode. An event is settled at each time a photon impinges the diode of the SPAD detector cell. The avalanching current has not necessarily a shape in voltage and time. Its raising edge is sometimes covered by electric noise. The pulse conditioning device performs a correct shaping of the generated pulse for the other processing circuits connected to the SPAD diode itself.

The conditioned output of the pulse conditioning device 43 is then connected to the input of a time-to-digital converter (TDC) 44. A regular clock 46 is applied to an input of the TDC 44 such that high resolution time-related data is generated at the output port of the TDC 44. This time-related data is related to the absolute depth location of the illuminated dot on the scene previously illuminated with the illuminating device of the invention.

In a preferred embodiment, the time-related information is contained in an averaged timestamp which is related to the series of pulses generated by the illuminating device.

Figure 7:
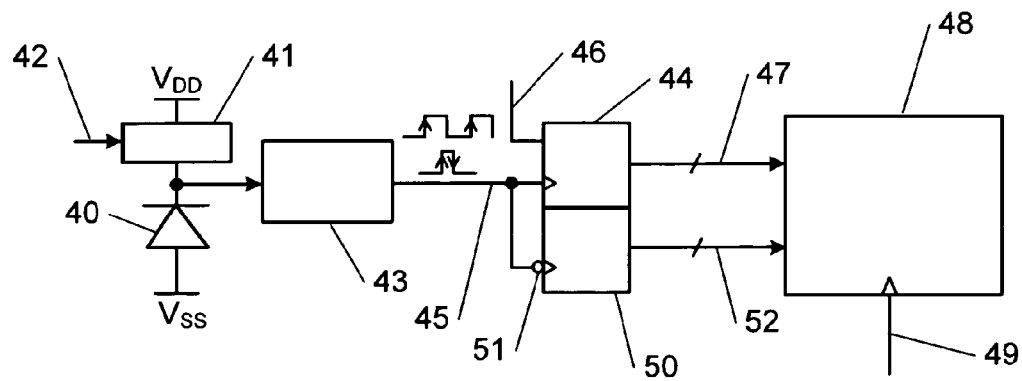
FIG. 7 illustrates normalizing operation.

The timestamp 47 is transmitted to an input data line 47 of a local DSP 48 which is built on some of the transistors formed onto a region 34 of each SPAD sensor cell 33 (see FIG. 5). To clock the processing of the timestamps 47 with the DSP 48, a reference clock is provided at each SPAD sensor cell of the SPAD sensor array. In an example, such a reference clock is chosen to be 100 ps. In FIG. 7, another embodiment of the processing chain of FIG. 6 is illustrated to run a normalizing operation. The same parts as in FIG. 6 are labeled with the same reference numerals. A second TDC 50 is provided such that the events 45 provided by the output port of the pulse conditioning device 43 are processed at the clock input of the positive TDC 44 and at an inverted clock input of a negative TDC 50. Two time-related data, "Timestamp+" and "Timestamp−", are transmitted at two separates data input 47 and 52 of the DSP 48 to be processed.

The inverter-chain-based configuration used in the TDC cannot arbitrarily extend to the number of inverters needed to cover the required range of 1 µs. That would require over 33 thousand inverters with all the associated problems of size, power consumption and resolution loss through non-linearity. They are augmented in the TDC core with a counter. The counter will be clocked by the system clock, for example a 10-GHz reference clock. This way, only 33 equivalent inverters would be needed. The extended range TDC will produce two physical output words: the timestamp of the 100 ps clock and the number of inverters between the 100 ps clock ticks.

The raw TDC output is dependent on PVT, so it is proposed to normalize it to the reference clock period. In this way, the output will be a single word in a fixed-point (integer and fractional) format wholly normalized to the 100-ps clock.

Figure 8:
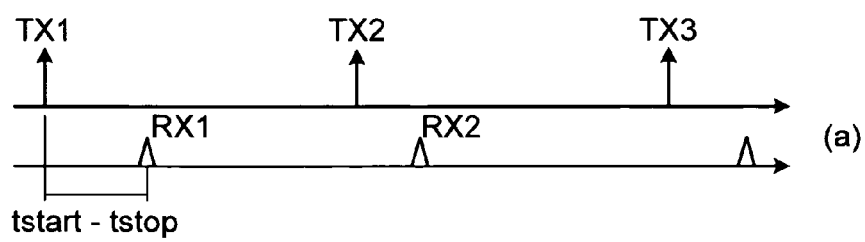
FIG. 8 illustrates differences between "$T_{on}-T_{off}$" and timestamps.
Figure 8:
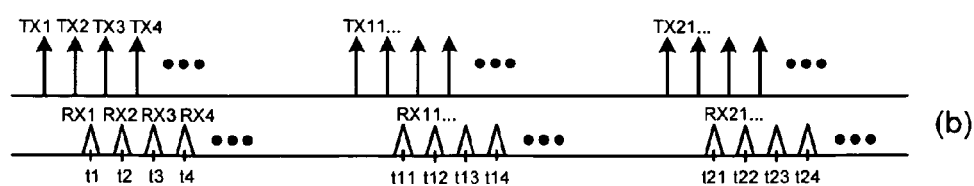

In FIG. 8, the differences between "$T_{on}$-$T_{off}$" and timestamp strategies are illustrated. At the part (a) of FIG. 8, the "$T_{on}$-$T_{off}$" strategy is illustrated. An illuminating device generates a series of light pulses TX1, TX2, . . . toward the scene to be represented. A light sensor oriented toward the illuminated scene detects the reflected light and generates a series of received pulses: RX1 received from TX1, RX2 received from TX2, . . . . The time of flight is represented by the difference $t_{start}$-$t_{stop}$ as marked at the third line of part a) from which the distance from the reflective part of the scene can be derived.

However, the standard time of flight strategy is flawed when a high repetition rate of illuminating light pulses is needed as according to the present invention.

Instead of this, a timestamp strategy is designed as illustrated at part (b) of FIG. 8.

At the second line of part (b) of FIG. 8, the received pulses are generated which present the same timestamp such that the time interval between two received pulses allows the correlation between the various received pulses. In FIG. 8 part (b) at the first line three packets in a train of pulses are generated at a very high frequency. In the first packet (left side) les pulses of the train are TX1, TX2, TX3, . . . . Due to the so-called timestamp strategy, it is not necessary to wait for the arrival of the last pulse onto the sensor of the reflected light as according to the standard "time-of-flight" strategy (see part (a) of FIG. 8). The start time of a counter of the timestamp is initiated as the first pulse TX1 and at each arrival of a RXi pulse on a SPAD detector cell, the counting value is read to be a time of flight from the corresponding TXi. From that timestamp, a depth value from the reflecting dot of the illuminated scene is derived and from the direction of the illuminating train of pulses and from the position of the SPAD detector cell in the SPAD detector array, a position in front of the scene is derived. Therefore, the counter at each SPAD detector cell allows the provision of timestamps t1, t2, t3, . . . from each received pulse TX1, TX2, TX3 in the first packet of pulses, and then t11, t12, t13, . . . from the second packet RX11, RX12, RX13, and so on.

In an embodiment of the present invention, the timestamp is simply a binary value (example: 32 bits) representing the value of the time of arrival of each pulse in a single binary value for each pulse. The start time of this binary value is not the start of the individual emitted laser pulse of the received pulse, but the start of the train of pulses (possibly globally delayed) that will be averaged globally for measuring a single 3D depth value. Therefore, each SPAD detector cell comprises a local DSP which detects a start time of the timestamp and stops a 32-bit counter when a photon has been detected at the SPAD diode as an event.

In an embodiment, a control data link is provided between the receiving part with the illuminating device to inform the receiving part of a reference time, as a start time of a train of illuminating pulses. In another embodiment, the reference time is marked in the train of pulses only with missing or modulated pulses on special (not normally used) tagged packets. At the receiver, the timestamp is created by the controller based on the known start of frame time of the emitter (with or without a delay). So there should be preferably a device-to-device low jitter link between emitter and receiver. Alternatively, a calibration process could occur between unlinked emitter and receivers to replace this direct link.

In another embodiment, the SPAD sensor array of the invention comprises also means for running a program and a method based on multi step, progressive data acquisition with programmable measurement time/averaging. To represent a scene on the basis of the acquisition of 3D data, a first step is executed with the acquisition of raw 3D data. In an example, several series of light pulses are emitted from the illuminating device carrying at least one averaged value of timestamp on a first scheme. The received pulses are recorded as preliminary data. A preliminary analysis is carried out by a program stored and run at the global DSP level of the SPAD sensor array to generate at a raw representation of the scene comprising the outline of the position and of the shapes of the various objects of the illuminated scene.

Based on this preliminary data on the outline of the position and outlines of the targets, acquired with a limited number of pulses, limited power of pulse averaging and then limited precision, the acquisition of the selected detail of chosen targets is made possible at high speed. Such fast acquisition is based on the filtering capability provided by the knowledge of the preliminary data. Another advantage of such a technical feature is that one can optimize the number of pulses for an optimum trade-off between the resolution of the representation of the illuminated scene and the human safety strategy involved by the use of laser light. By lowering the power of the pulses and spreading the total emitted power in the time, human safety is enhanced and the scheme of the progressive scanning is partly commanded by the programmed constraints of the human safety strategy, stored in the controller of the illuminating device and run to control the progressive scan.

Therefore, a second step is carried out, under control of a program stored and run at the global DSP level of the SPAD sensor array of the invention, with several other frames of light pulses emitted by the illuminating device with different power levels if necessary, and carrying other timestamps under another enhanced resolution and/or with limited targets at the areas of the scene in which more data are required to obtain a better representation of the scene, both in static mode and in mobile mode.

According to the required resolution of the representation of the scene, the second step can be repeated at least one time and the successive data of the various scans are accumulated and/or combined to the preceding acquired representations at lower resolutions by means of a program stored and run at the global DSP level of the SPAD sensor array of the invention.

This capability is linked with the timestamp, smart filtering and blanking advantages.

In another embodiment of the present invention, the SPAD sensor array comprises means for applying a global blanking of light pulse reception within the detectors to extend the acquisition distances and to add noise mitigation capabilities. At least a first step of a progressive scanning is initiated first. The resulting knowledge of the approximate distance of the targets in the scene allows the correct selection of the optimal blanking period duration during non-landscape, non security measurement phase. During the period of the blanking, no external light or internal noise pulse could trigger an avalanche.

In another embodiment, this capability of blanking is complemented with the smart statistical processing and/or filtering capabilities of within the SPAD sensor cell and is made possible by the progressive acquisition strategy used.

Figure 9:
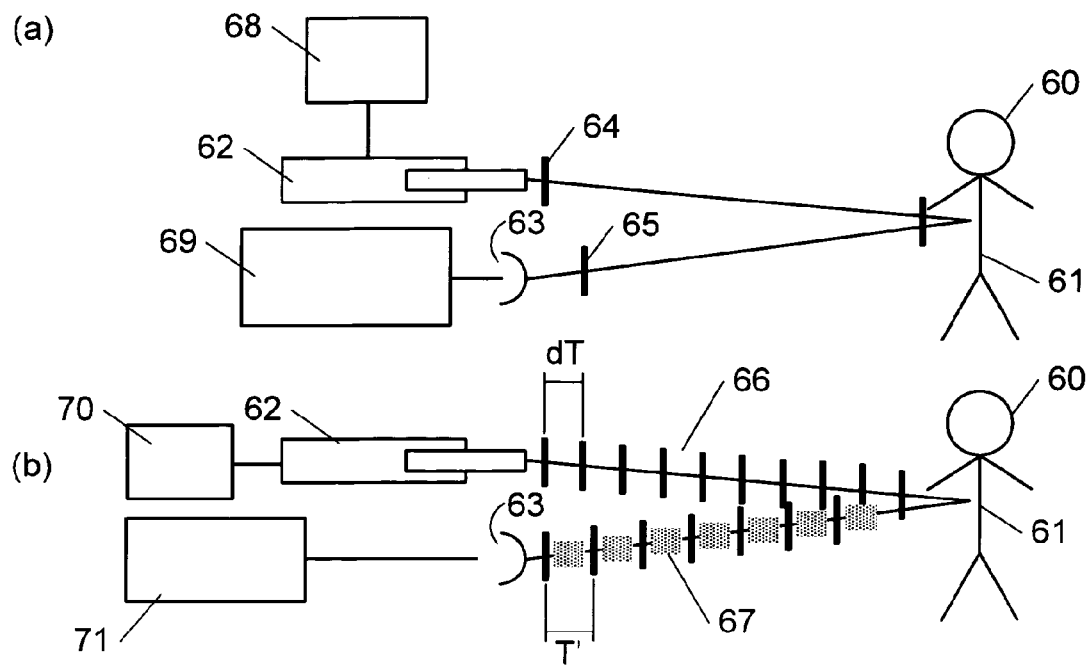
FIG. 9 illustrates blanking and non-blanking acquisition phases.

In FIG. 9, part (a) of the Figure describes a first step of acquiring a coarse representation of the scene, and a part (b) of FIG. 9 describes a second step of acquiring a fine or detailed representation of the scene under blanking and non-blanking acquisition phases.

The controller of the illuminating device 62 comprises a generator of a first pulse train at a given pulse spacing, said T1, such that the mode-locked laser of the illuminating device 62 emits pulses like 64 toward a given point 61 of a scene 60. The object in the scene reflects a light pulse 65 of the emitted light pulse series that impinges at least a SPAD sensor cell 63. The various DSP, both local DSP of the impinged SPAD sensor cell 63 and the global DSPs of the overall SPAD sensor array, run a means 69 for generating a coarse representation of the scene.

Before deciding another step of acquiring a more detailed representation of the scene, the means 69 for acquiring a coarse representation of the scene 60 send configuration data to a means 70 of generating a new series of light pulses of a longer duration (more averaging capabilities, strongly reduced jitter) than the first series of light pulses. The means 70 is built at the controller of the illuminating device 62 and generate a series 66 of light pulses which are separated with a given time, said dT, at a higher frequency than the frequency at the first attempt to acquire a frame, shown in the FIG. 9 part (a). When reflected by the object 61 of the scene 60, the reflected light pulses 67 impinge the SPAD sensor cell 63 which is affected with a blanking process. According to the frequency of incident series of light pulses, the knowing of the coarse representation allows the choice of a temporal window T' between the reception of two successively received light pulses during which a "blanking" is affected. During the "blanking window" T', no avalanche occurs due to a photon impinging the SPAD diode is processed with the SPAD sensor cell. That rule is programmed by a means 71 for generating a fine representation on the basis of the coarse representation which is implemented with both the local DSP of said SPAD sensor cell 63 and with the global DSPS of the overall SPAD sensor array.

The first part of blanking (continuous blanking) is easily calculated based on the previous knowledge of the distance between the emitter and the target (minus a safety margin). For the periodic blanking (when the return pulse is allowed to switch the SPADs), the blanking duration is based on the knowledge of the fixed frequency of the mode-locked emitter. The "position" (phase) is based on the approximate position of the target, a margin is allowed, since a perfect blanking is neither possible (electronic picosecond level blanking is not possible), nor interesting because it would require to know the exact return time of a return pulse which is exactly what is measured.

The blanking action is acting on the SPAD detector itself, the smart filtering is doing the same kind of action after the conversion to digital (time to digital) at each TDC converter on a SPAD detector cell.

Figure 10:
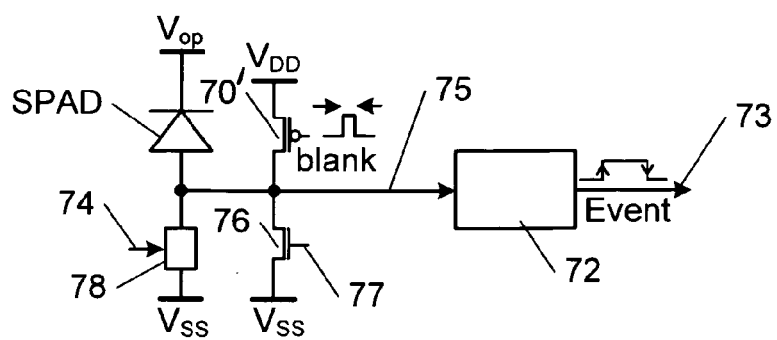
FIG. 10 illustrates SPAD blanking circuits.

FIG. 10 illustrates an embodiment of a SPAD blanking circuit according to the present invention.

At each SPAD sensor cell, a single photon avalanche diode (SPAD) is connected to an operating voltage $V_{op}$ with its cathode, and its anode is connected to a substrate potential NL by means of a active quenching circuit 78 which can be controlled with a digital signal generated by the local DSP of said SPAD sensor cell on which the SPAD diode is integrated.

The anode of the SPAD diode is also connected to an input 75 of a pulse conditioner 72 by means of a blanking circuit which comprises a first MOS transistor 76 connected between the input 75 and the $V_{ss}$ potential. A second complementary MOS transistor 70' is connected at the common node 75 to a reduced operating voltage Vdd of the SPAD sensor array.

In an embodiment, the reduced voltage Vss is 6 times lower than the operating voltage Vop. For example, Vop is 19 volts and Vdd is 1.4 volts.

Under the action of the means 71 (FIG. 9) a "Blank" signal generated at the local DSP (not shown by FIG. 10) of the SPAD sensor cell turns on the second transistor 70' during the period lapsed between two "blanking windows" such that any occurring photon at the SPAD diode generates a received electrical pulse which passes to the input 75 of the pulse conditioner 72 to be built as an event at its output 73.

The "Blank" command is a square signal which acts at least during the generation of a series of light pulses at the mode-locked laser of the illuminating device. For example, such a "Blank" command has pulses with a duration of 16 ns (on a pulse period of 20 ns) which can be varied as it has been explained above in FIG. 9.

The smart filtering following the blanking action to further eliminate the "bad" pulse is mainly based on the almost perfect synchronicity between the pulses of the same frame (except for small movements during the measurement). All "out of range" pulse will receive low coefficients or will be eliminated.

Another input 77 at the gate of the first transistor 76 is connected to an output of the means 71 (FIG. 9) for generating a fine representation of the scene to reset the blanking circuit.

In another embodiment, a programmable size, multi detector which optimizes the resolution/speed ratio (at macro-cell level) is provided. The SPAD sensor array comprises means for building programmable, flexible macro-cell size of variable number of SPADs to average the ToF (Time of Flight) value of a single 3D pixel or a group of pixels. In another form of the embodiment, variable aspect ratio macro-cells are built directly on board of the SPAD sensor array. Some macro-cells form a "blanking group" where most SPAD diodes will not be able to be avalanched and the other SPAD diodes will be ready to be avalanched. This will multiply the speed (or the availability) of the macro-cell relative to the speed of a single SPAD diode. For example, if the mean time of a quenching operation at the breakdown voltage is of 20 ns, a 4-SPAD diodes macro-cell will have availability for avalanching each 5 ns, instead of 20 ns. The price paid for this multiplication of speed will be a loss of efficiency proportional to the fraction of the blanked SPAD diodes.

Another macro-cell optimization technique does not rely on blanking to improve the speed and resolution of the SPAD sensor array, but works mainly in the starved-photon regime. In that regime, not sufficiently many photons at each pulse for all the detectors of the macro-cell are received, i.e., most SPADs are not triggered. The global efficiency will be better, but the number of involved SPADs should be bigger (for an equivalent final spatial resolution).

The macro-cells, of programmable size will also encompass the local DSP of the macro-cell. There will be a tradeoff between speed and resolution. Very high speed will be possible when the frequency of the pulses will be so high that a significant fraction of SPADs (but also complete macro-cells) will not be actively available for receiving/processing of some pulses. This will means absence of detection of the majority of photons but not all of them. The consequence of this "forced march" will be a reduction in depth (relief) resolution. This will be mainly useful for the acquisition of 3D data for moving targets.

Figure 11:
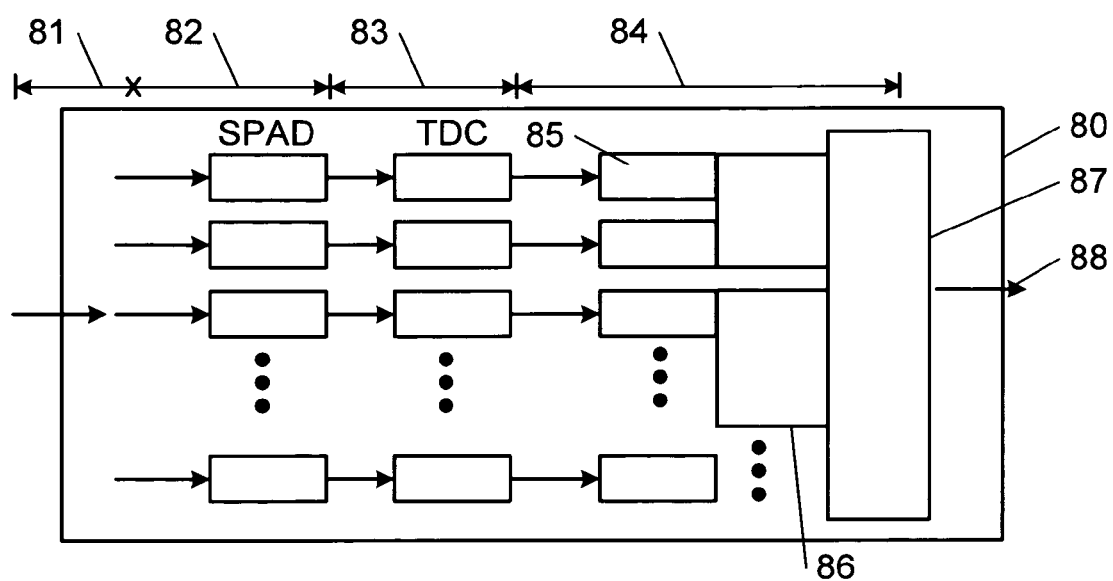
FIG. 11 illustrates SPAD, TDC and multi-level DSP organization.

In FIG. 11, it is illustrated a SPAD, TDC and multi-level DSP organization according to the above cited embodiments.

The SPAD sensor array is built on a CMOS integrated circuit as a substrate as it is described above. It comprises at least four sections:
- A photon conditioning part 81, which is just indicated in FIG. 11, and which comprises elements such as lens and diffusers as it will be more completely described below;
- a photonic section 82 which is associated with said optical section 81 and which receives the impinging photons, from which are the reflected photons arranged according to high-power ultrashort light pulses identified with timestamps and/or signatures; the photonic section 82 comprises mainly the SPADs of the SPAD sensor array;
- an analog part 83 which converts the received photons from the photonic part 82 in pulses (Geiger/avalanche mode) that directly trigger the time-to-digital converters
- a digital section 84 in which the pulse currents are converted to digital data, processed and/or combined. Said digital section comprises three subsections, namely:
  - the local DSP which is associated with each SPAD sensor cell;
  - a series of macro-cell DSP 86, which are connected to a defined group of local DSP (for example from 1 to 16 detector DSPs); and
  - a global DSP 87 which is placed at the free parts of the SPAD sensor array not occupied by the circular array of the SPAD sensor cells and which is connected to the overall macrocell DSP 85.

The global DSP processes the received timestamps series 88 from which a representation of the scene is synthesized.

Figure 12:
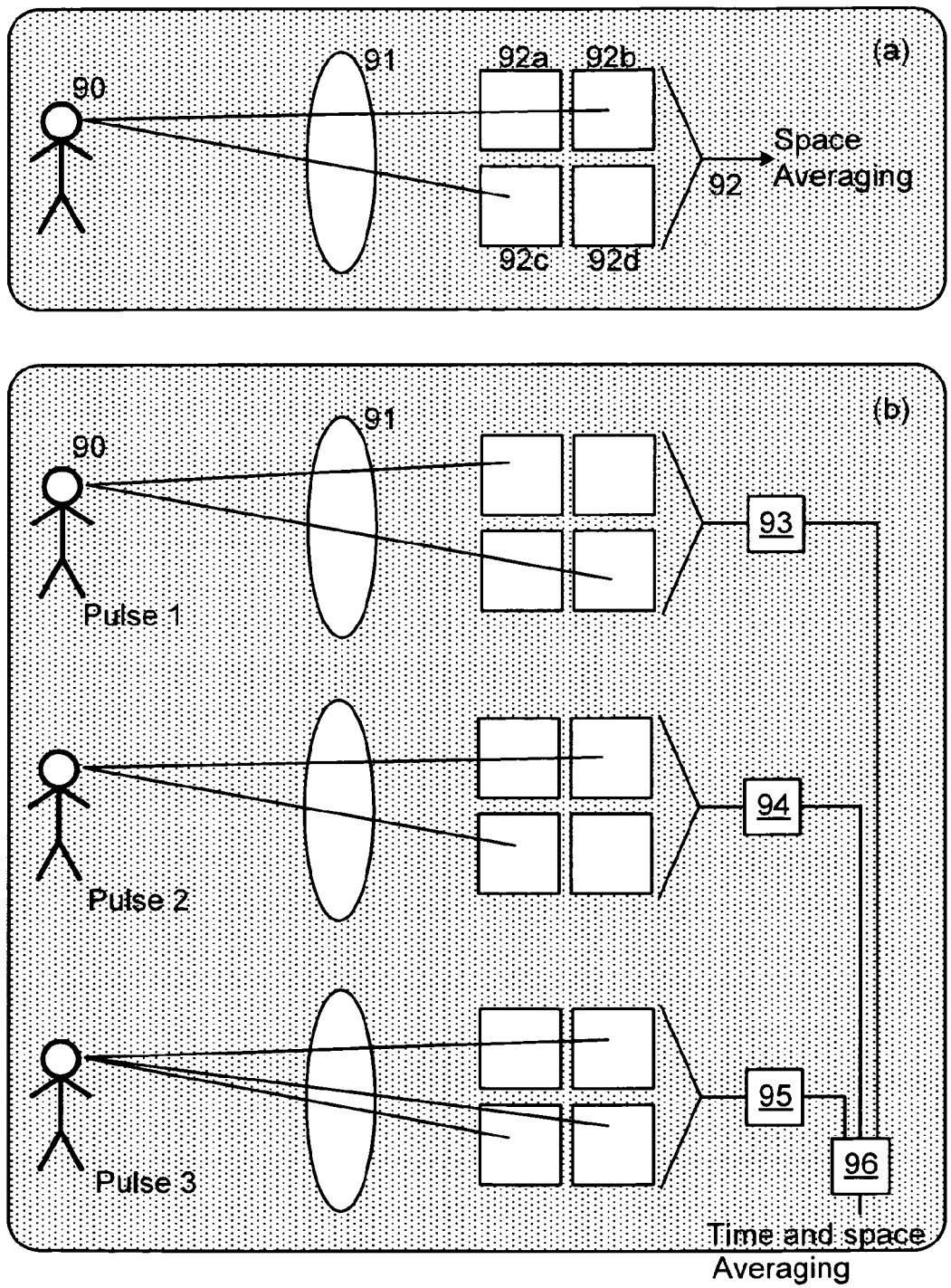
FIG. 12 illustrates smart averaging in time and space for a 4 SPAD detector macro-cell.

In FIG. 12, a smart averaging in time and space for a 4 SPAD macro-cell is described. In part (a) of FIG. 12, a 4-SPAD sensor cell 92 of the SPAD sensor array is arranged in a macrocell to produce an averaging at four pixels distributed on a square in the SPAD sensor array. After a single pulse is received from an object 90 in the illuminated scene through a convenient collecting optics 91, only two SPADs 92b and 92c are impinged by photons related to the emitted light pulse series of the illuminating device. A DSP associated with the 4-SPAD sensor cell arranged in a macro-cell reads in the timestamp values of each of the four SPAD sensor cell 92a, 92b, 92c and 92d, and then an averaging in space is performed and used as a partial data of a part of a representation of the illuminated 3D scene.

In part (b) of FIG. 12, the same elements as in part (a) of FIG. 12 are not more labeled. The same macrocell is used to run with an averaging in space and an averaging in time. For each successive received pulse impinged on any SPAD of the macrocell, P1, P2 and P3, an evolving averaging in space is computed at the local DSP on the macrocell. Then the results are stored in a memory connected to the output of the space averaging process ran at the local DSP of the macro-cell, memory 93 for P1, memory 94 for P2 and then memory 95 for P3. Then, a time averaging process 96 is performed at the local DSP of the macrocell to output a smart averaging of the timestamps at the macrocell level.

In another embodiment, a further process is used to reject false detections. In a first step of the illuminating strategy, as it has been previously described, a low resolution data is acquired. Therefore, the knowledge of the range of the actual depth of the pixels related to the macrocell 92 is used to reject some detected timestamps as too far out or near. Therefore, a filtering of the false detection is performed at the local DSP of the macrocell prior to run a space averaging.

In another embodiment, it is provided a means for breaking the usual limitation of the number of received light pulses in limited time linked to the rules of avoiding the launch of a pulse only after the return of a previous pulse. This limitation is linked to the finite time needed for the light to make a round trip (time of flight) and to the risk of confusion between two successive pulses. This advantage is made possible by the progressive acquisition and blanking/filtering capabilities and by the timestamp capabilities (see FIG. 8 on the differences between "Ton–Toff" and the timestamps). The availability of a global timestamp (system time) will be important to make possible the detection of the correct "issued from the right target" pulses signals. It would be possible to use multiple "Ton–Toff" simultaneously but this would be quite cumbersome and inefficient. Generally, the 3D sensors are not sending pulse or signal at a rate faster than the time needed for a light pulse to make the round trip between the sensor and the target. The knowledge of the timing of the first pulse and "phase" of arrival of the "right" pulses and the capabilities to suppress "bad" pulses by the blanking electronics makes this acceleration possible. In some special cases, tagging the measurement packets of pulses could be substituted or added to the blanking to this end. Extended on-sensor filtering (based on knowledge of the expected timing of the pulses) could in some cases be substituted but generally combined with the physical blanking (at the SPAD level).

Another embodiment also provides a method for statistical data treatment (filtering) that is done in close proximity (no bandwidth limited) to the SPAD sensor array. To manage an unbearable rate of raw data transmission, it is essential that optimal removal/mitigation of false detection (meaning not the result of "issued from right target" return pulses) and averaging of the timestamps for the duration of the frame acquisition will be done closely to the detector (i.e., at the cell level). This filtering/averaging will generally use the "best fit" algorithm and improve very significantly (over the SPAD timing jitter characteristics) the depth (relief) precision of captured 3D data. They use also smart, variable averaging of data between close groups of SPADs (at the macro-cell level). In the prior art, this averaging action has occurred only in an external chip (DSP or CPU). All the raw data can then only be transported with a much reduced speed.

Figure 13:
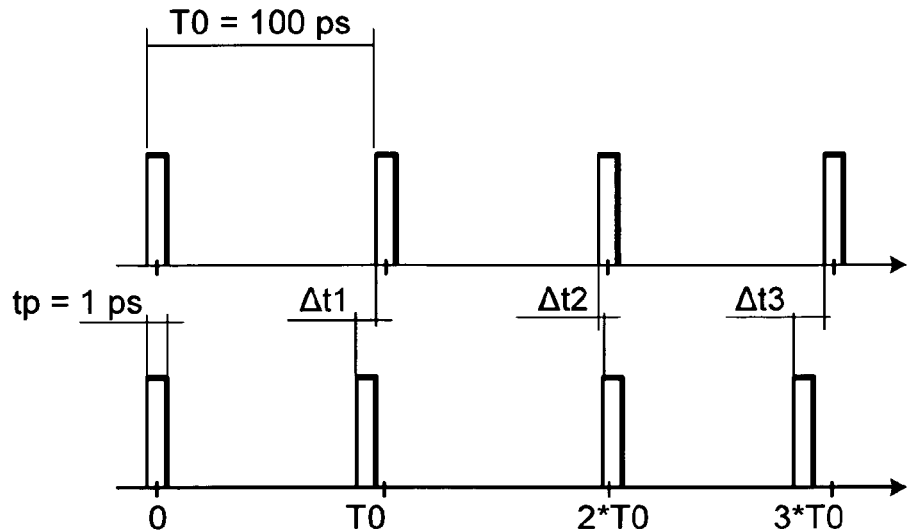
FIG. 13 illustrates jitter of a SPAD sensor cell.

FIG. 13 illustrates the timing jitter of a SPAD. If a series of light pulses at T0=100 ps is emitted close to the diode, with a width of each pulse at 1 ps, the electrical signal produced by the SPAD sensor cell should be slightly delayed from a constant quantity. However, a statistical variety of delays are recorded at each pulse, namely $\Delta t1$, $\Delta t2$, $\Delta t3$ which show the jitter of the diode.

Figure 14:
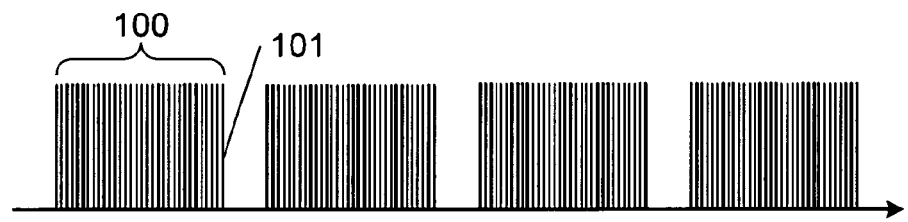
FIG. 14 illustrates multi-pulses used for allowing the averaging (square law illustrates of the timestamp for a single pixel)

FIG. 14 illustrates a multi-pulse strategy used to allow the averaging according to a square root law of the timestamp for a single pixel and, then reducing the effect of the jitter.

Each pixel is acquired, generally not with only one pulse, but with a series 100 of tens of ultrashort pulses 101 which are averaged in time according to a square law of the timestamp for a single pixel. Such an averaging reduces the jitter effect.

Figure 15:
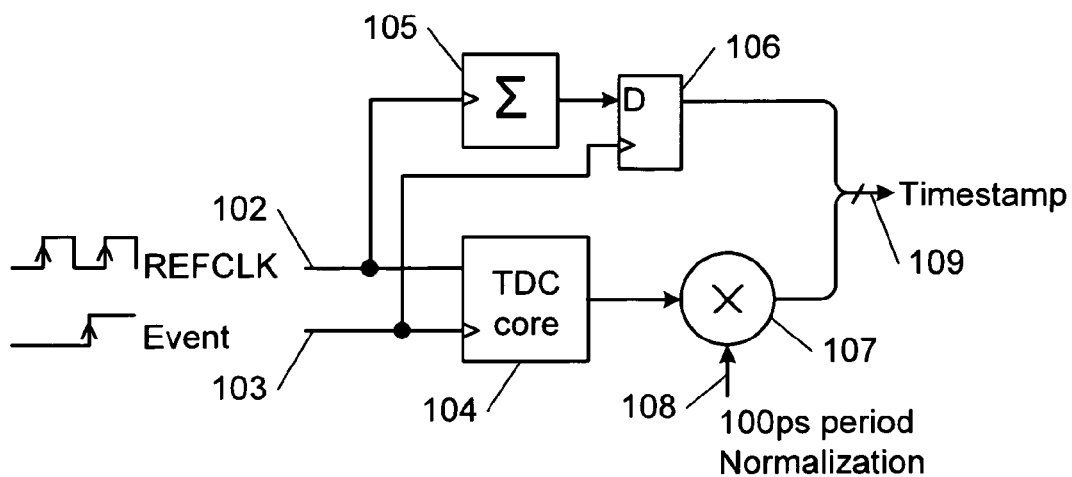
FIG. 15 illustrates averaging of timestamps.

In FIG. 15, a circuit able to provide an averaged, high resolution value of all pulses timestamps is presented according to the present invention. A reference clock 102 is applied to an input REFCLK of the averaging circuit with an event 103 produced at a SPAD. The both signals are processed, as it has been explained previously, at the TDC core 104 to recover the timestamp associated with the event. A counter 105 counts the ticks of the clock 102, and the result is latched at a D-type flip-flop 106 clocked at the event signal 103.

The output of the TDC 104 is passed through a normalizer 107 which works with a normalization period at 100 ps, at an input 108. The result of the latched count and of the normalization of the events is provided at the output 109 as the timestamp values.

Figure 16:
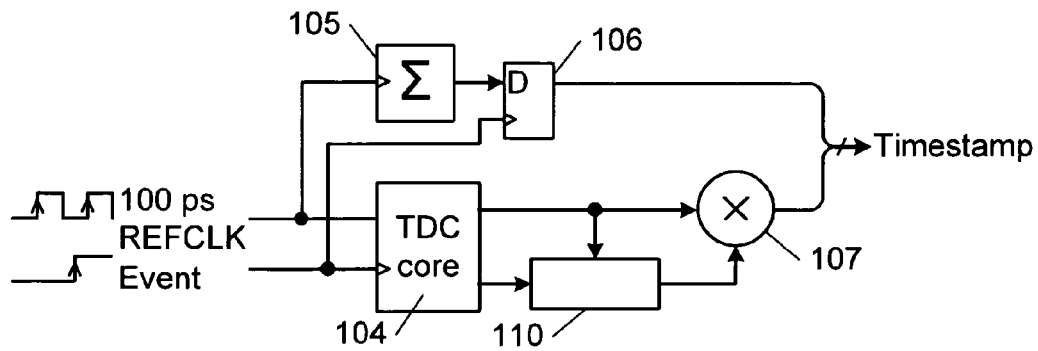
FIG. 16 illustrates compression of timestamps.

FIG. 16 illustrates a circuit for the normalisation of timestamp data. In FIG. 16, the same elements as in FIG. 15 carry the same reference numerals and are no more described. At the input of the normalizer 107, an inverse calculation device 110 (multiplier) is connected which presents two inputs and one output which is connected to the clock input of the normalizer 107.

Figure 17:
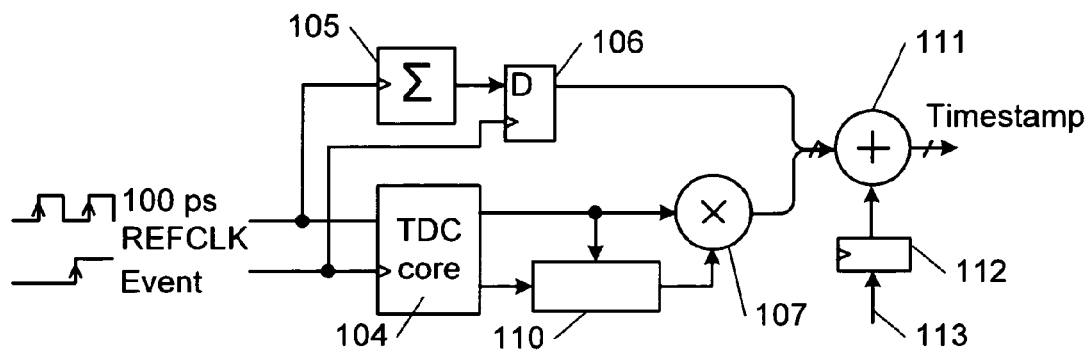
FIG. 17 illustrates a local data correction mechanism.

FIG. 17, illustrates a local data correction mechanism that is used for correcting optical or system aberrations. In FIG. 17, the same elements as in FIG. 16 carry the same reference numerals and are no more described. At the output of the compression circuit of FIG. 16, an adder 111 is connected whose first input receives the timestamp data and a second input receives local correction data 113 cached by a register 112. The output of the adder 111 provides a corrected timestamp.

Figure 18:
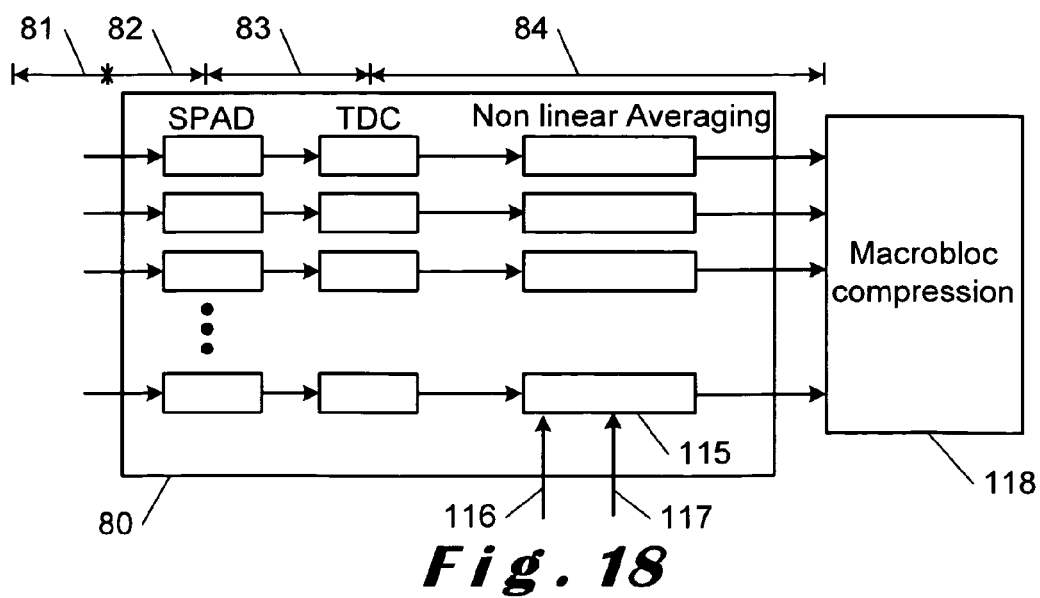
FIG. 18 illustrates detector-level data filtering/averaging.

FIG. 18 describes an embodiment of the SPAD sensor array with a detector-level data filtering/averaging capability. In FIG. 17, the same elements as in FIG. 11 carry the same reference numerals and are no more described. After the TDC core has produced the raw timestamps of the received pulses, they are passed to the input of nonlinear averaging circuit 115. Each nonlinear averaging circuit 115 comprises also two clock inputs: 116 for a master clock and 117 for a frame clock. The output of each of the nonlinear averaging circuit 115 is transmitted to a compression macrocell 118.

In another embodiment of the present invention, a global DSP runs a geometrical correction on the overall representation of the illuminated scene. Each SPAD detector cell is provided with a register or other permanent memory which contains an identifier of the SPAD detector cell in the grid along the SPAD detector array. Each signal delivered at a SPAD detector cell is marked with the ID identifier of the cell. As its position in the grid is known, even if the SPAD detector array is moving, a global DSP of the SPAD array can to correct geometrical errors due to any known and modeled physical defect on the optical path from the illuminating device to the SPAD detector array or the receiving part. Notably, it is possible to correct imaging errors arising from optical components.

In another embodiment of the present invention, a local DSP runs a program to interpolate between two or more acquisition dots. When a first and at least a second dot have been acquired at a SPAD detector array from the illuminated scene, two depth values are processed from the time-related information provided by the TDC converter. According to the present invention, a mathematical function f( ) is used to interpolate at least one dot $a_i$ from the two already acquired dots $a_1$ and $a_2$ so that a third intermediate dot $a_i$ is computed with a determined relation: $a_i=f(a_1, a_2)$. The invention provides a method to enhance in real time the resolution in terms of the number of dots in the representation of the scene. The capability to make the measurement of the change of the relative position of the targets and the sensor due to the high speed of acquisition is an essential ingredient of an efficient interpolation.

Due to the averaging mechanism, it is preferable to provide such a capability at the level of a macrocell of the SPAD detector array. In a macrocell, the depth z of a dot is acquired on the basis of an digital averaging of the timestamps detected at the TDC converters of the SPAD detector cells linked to the determined macrocell. At the time a first and a second dot are acquired at the macrocell level, the same interpolation process is programmed onto the local DSP associated with the said macrocell. An enhanced resolution is then obtained.

Figure 19:
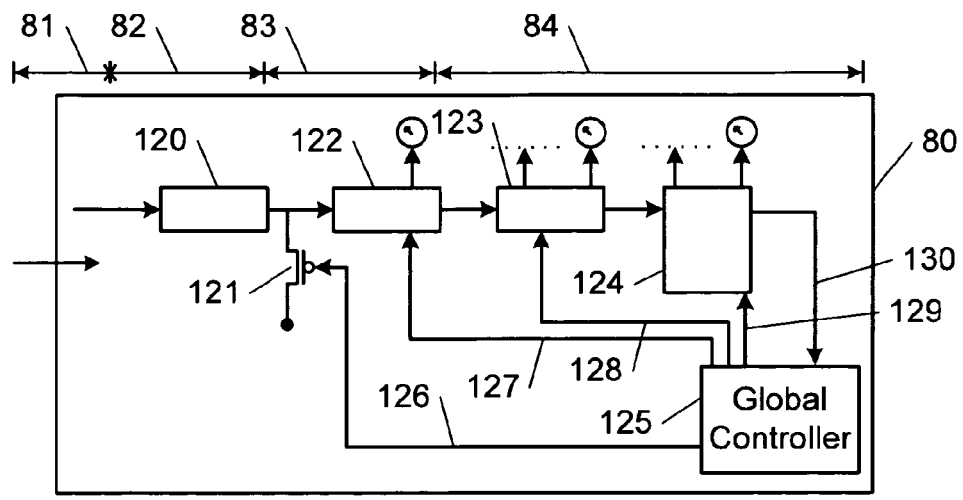
FIG. 19 illustrates a global controller supervising the various levels of the data processing as well as timing the SPAD blanking signals.

In FIG. 19, a global controller supervising the various levels of the data processing as well as timing the SPAD blanking signals is illustrated in another embodiment of the present invention. The control signal granularity can range from the finest (at individual cell level) through the middle-fine (at the macro-cell level) to the coarse level (at the global level).

In FIG. 19, the same elements as in FIG. 11 carry the same reference numerals and are no more described. A SPAD 120 of the SPAD sensor array is connected, as it has been previously described, to a time-to-digital converter 122. Its output is connected to the input of a detector DSP 122 which has connections to a local memory (local address). The timestamps output at the detector DSP are passed to a macrocell DSP 124 output which is connected to an input of a global controller 125. The global controller 125 issues commands and control data on window timing, optics, geometry, interpolation and local treatments by lines 126 to the gate of a MOS transistor 121 which is activated by a blanking signal as it has been previously described to execute a blanking process of the events, a line 127 to control the TDC 122, a line 128 to control the detector DSP 123, and a line 120 to control the macrocell DSP.

In another embodiment, a means is provided to make use of just-in-time clocking and powering of the cells. To limit the power consumption of the chips, the cells are activated (clock reception and powering of the logic) only when the global controller expects the reception of pulses. The start of the timestamp is optimized to this end.

Figure 20:
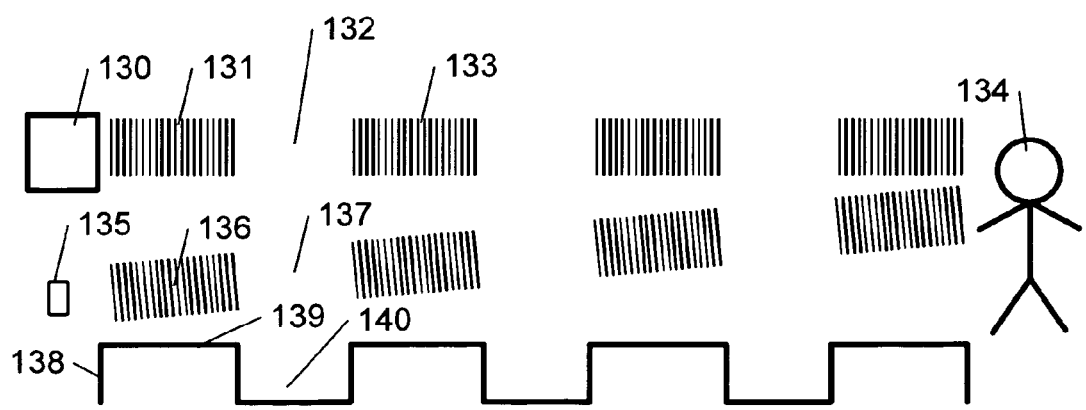
FIG. 20 illustrates a clock and power-saving architecture for cells, where parts of the electronic are disabled at times where no valid signals can be expected.

In FIG. 20, a strategy for a just-in-time clocking and powering of cells is described.

An illuminating device, as previously described based on a mode-locked laser coupled to an Er-doped fiber amplifier produces a series 131, 133 of packets of ultrashort light pulses toward a scene 134. Each packet 131 is separated from its predecessor 133 with a "silent time" 132. When reflected at the scene 134, the light pulses are temporally distributed in a similar manner. Therefore, it is convenient not to activate the SPAD sensor array during the "silent time" 132. To obtain that effect, the SPAD sensor array is provided by a global DSP which is set on the basis of the illuminator device 130 such that the clock and power resources are inactivated during the silent periods 132 which are produced by the silent times 132 of the incident light pulses 131, 133.

The SPAD 135 of each SPAD cell is then only activated during the time 139 when a series of pulses 136 is due. Such a setting is established during a first scan at a coarse resolution by the global DSP which controls the clock and power resources in the SPAD detector array. When a fine resolution is settled by the global controller, the just-in-time clocking and powering resource of the SPAD detector array is running.

In another embodiment of the invention, the use of on-detector pattern recognition of tags on the measurement packets is implemented in a dedicated resource. This resource is useful when it is not possible to use blanking or filtering of the pulses (when the target is not yet well known). The tagging of measurement packets or complete frames will help to ensure the appropriate timing of the pulse emissions.

Figure 21:
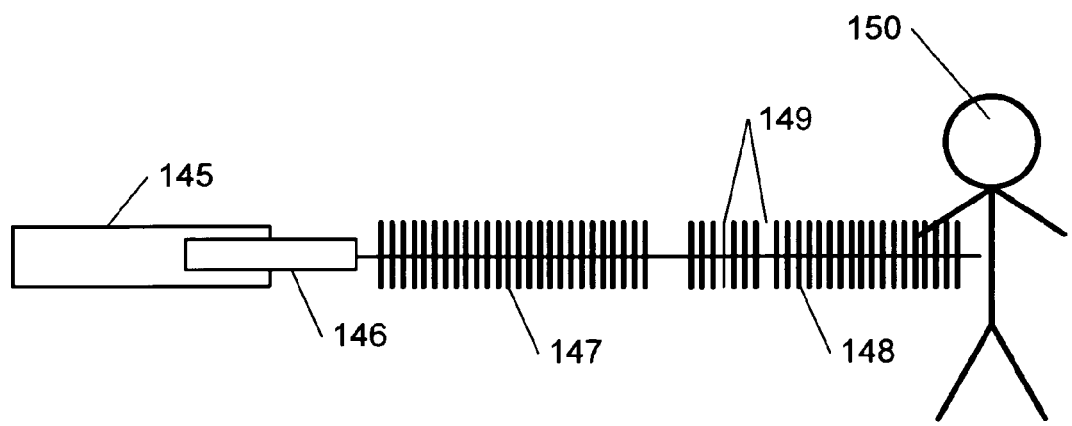
FIG. 21 illustrates tagged and non-tagged packets.

In FIG. 21, tagged and non-tagged packets are described to explain the function of on-detector pattern recognition of tags on measurement packets. The illuminating device 145 comprises, as it is has been previously described, a controller (not shown) to activate a predetermined series of ultrashort laser pulses 147, 148. In the example of FIG. 21, a first tagged packet in the series of pulses is impinging the target at the scene 150 to be reconstructed. Then a second non-tagged packet is emitted. The tagged packet is built as the non-tagged packet, except that some predetermined pulses in the packet are removed.

When received at the SPAD detector array, a packet is detected and, if it presents the same temporal position of missing pulses, it is recognized as produced at the time by the illuminating device. In another application, when it is recognized that in the received tagged packet a pulse is lacking, a signal is provided to synchronize the SPAD detector array.

In another embodiment, a multi-level DSP inside the sensor chip is used. This multi-level organization is essential to limit the data transfer requirements and allows a flexible, local macro-cell on-demand building (see FIG. 11 SPAD, TDC and DSP organization). It should be also advantageous to utilize certain latest developments in the field of advanced stream media processing, such as an array of application-specific instruction set processors (ASIPs), in which each ASIP is optimized to efficiently perform only a limited but dedicated subset of operations. In a typical scenario, the ASIPs are arranged in a cascade such that a complex stream-like operation is performed by a number of efficient engines, each with varying range of limited capabilities. These resources are integrated in the whole CMOS IC die In another embodiment, some very large improvements in data throughput capabilities are provided. The compression will use:
- the local averaging/filtering of timestamp data,
- the use of compression capabilities at the macro-cell level for temporal and spatial compression,
- the use of compression capabilities of the global DSP for temporal and spatial compression.

The compression could be either lossy or lossless.

The high speed of acquisition of the SPAD detectors will require high-performance data processing and transfer capabilities. The local data processing will generally allow the transfer of only the averaged value of each "pixel" outside the local SPAD pixel cell (formed of the SPAD detector, the TDC, averaging, filtering and supporting local logic). Even the transfer of this value would require the data rate of hundreds of gigabits per second (Gb/s) (at full rate).

This data rate would only be prohibitive under the current advanced digital CMOS technology if it were serialized or required to be taken off-chip. A system-on-chip (SoC) approach is used in which the signal processing engine (multi-level and multi-step DSP) resides on the same die as the pixel detectors. Techniques similar to JPEG encoding could be employed in which the third dimension, i.e., distance information, is treated in a similar way as the light intensity.

In some cases, only significant changes between 3D values will be transferred to the external world. This approach could also include the heterogeneous technology, in which the SPAD detector itself would be created immediately on top of the CMOS die. The availability of any advanced CMOS process will result from this multi-material technology chip building approach where the germanium and silicon process are carried out in an independent way with few dependencies between them. (See FIG. 1 Germanium SPADS Detectors at 1.5 μm Wavelength—Global view).

In an embodiment of the present invention, a capability is provided from the global controller to provide various types of data treatment instructions and to control local cells and macro-cells of the SPAD detector array. Such a capability is generally based on previous or historical data about the 3D surroundings or system aberrations, to local cells and macro-cells.

The control signal granularity can range from the finest (at individual cell level) through the middle-fine (at the macro-cell level) through the coarse (at the global level). These data correction instructions will have a variable level of granularity regarding the positioning of each detector and the time frame.

Each cell and macro-cell will have access to a local address calculated in relation to its position on the matrix. It will have also access to the time frame. The local availability of this global reference data will provide an advantageous way of treating data locally instead of centrally.

The cells and macro-cells will combine these reference data with the cell geometric positioning and time frame data to correct system errors like timing offset or geometric faults/aberration (see distance aberrations FIG. 21).

Other possibilities are the improvement in resolution or quality of the data through interpolations of data based on the variation in time of the acquired data and geometric position of the cell or macro-cell. Those variations could be detected passively (target movement) or controlled (controlled change of the optic path to the sensors). The global controller could also control and limit the quantity and quality of data going from the detector to the external world based on criteria of timing, rate of change and criteria linked to the targets.

Figure 22:
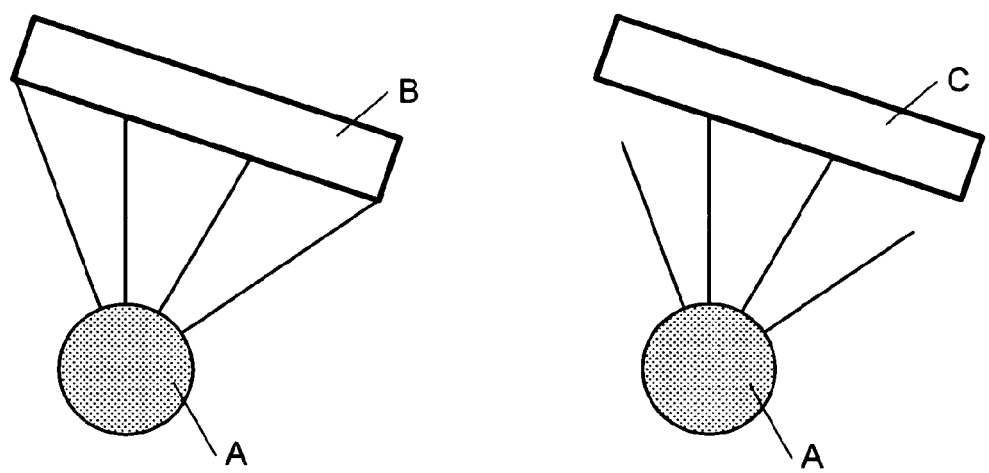
FIG. 22 illustrates some apparent and real distances for a large object captured over a large angular range.

FIG. 22 shows apparent and real distances for a large object captured over a large angular range. The global DSP is programmed to apply an optical correction to the apparent distances due to the aperture of the optics of the receiving part. The left side shows the apparent distance of a large flat target B from the circular receiving part A, as a SPAD sensor array with its proper optics. The right side shows the apparent distance from the circular receiving part A to the large flat target C in the scene. Due to the aperture of the optical means at the input of the receiving part, the apparent distance from the edges of the target, far from its center, should be corrected on the basis of the angular incidence. A mathematical function is programmed to transform an apparent distance or depth value generated at the TDC converter of each SPAD detector cell depending of the optical aberration and from the position of the illuminated dot.

In another embodiment, the correction of the systematic fabrication errors is shown. It is used for correcting errors like the clock tree distribution skew between SPAD macro-cells. The clock distribution between the cells in a macro-cell is equalized through the design process, but the remaining correction is put in place, mostly based on a calibration process using the high data processing capabilities of the on-chip DSP (data treatment and compression). The correction data obtained from calibration can be stored on an external non-volatile medium like flash memories.

In another embodiment, the whole process of transfer/compression is optimized to guarantee a low latency transfer of 3D data to the supervision unit (whatever supervision unit is used). The supervision process is run with a global controller like Global Controller which is built onto the same integrated circuit than the SPAD detector array or onto an external controller which is implantation dependant.

This will be especially important in the case where the first 3D data acquisition will be required to adjust the settings (mechanical and electronic) of the next 3D measurement like the acquisition of the details of a face. The whole measurement chain will be optimized to this end.

Figure 23:
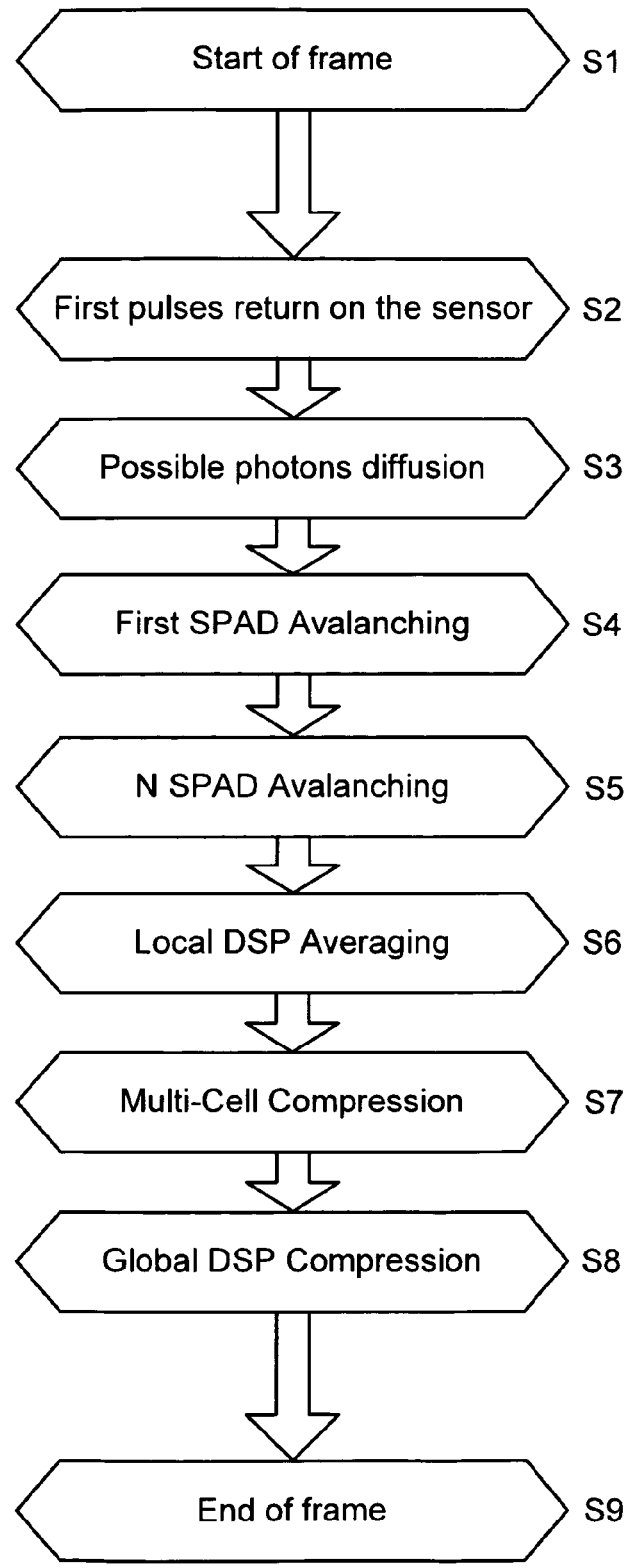
FIG. 23 illustrates the basic principle of operation of the sensor.

In FIG. 23 a diagram of the main operations of the SPAD detector array of the present invention is illustrated.

At a first step S1, the frame of the series of ultrashort laser pulses is initiated at the illuminating device. Then, at a second step S2, the first pulses return to the SPAD detector array, and at step S3 photon diffusion can take place in the diffuser above the photosensitive cells. At step S4, a first SPAD avalanche occurs and then, at step S5, the successive N SPAD avalanches occur.

Then, at step S6, a local DSP averaging is done, and then at step S7, a multicell compression is performed, and then, at step S8 a global DSP compression is done. Although they are compressed, those data are the pixel representation of the imaged scene when acquired at the SPAD detector array, because they are fully detailed. The compressed data are made available to an external processor (not disclosed here) to generate an 1D, 2D or 3D image and also a 3D CAD-mesh model of the imaged scene. At last, at step S9, the frame is ended.

In another embodiment of the present invention, a matrix imaging sensor is using:
  mostly symmetric macro-cells
  mostly long pulse trains to gain timing precision about to the value of pixel depth
  mostly not use physical diffusers on top of the detectors.

In another embodiment of the present invention is provided a 2D version of the SPAD matrix able to capture pixel values of 2D targets (possibly in color) while rotating at high speed.

In another embodiment of the present invention, a texture mapping with a combination of 3D data and grey level could also be done with static 2D sensors.

In another embodiment of the present invention, a system made of multiple rotating SPAD detector arrays to catch various focus distances in a short time is provided. Such a system
  uses the inherent 2D measurement capabilities of SPAD detector arrays as described in the literature;
  could use any type of source illuminating the targets at all wavelengths from visible to infrared or ultraviolet
  shifts the accumulated photon detections (during the very short time of angular coincidence between the sensor pixel and the target pixel) from one cell column to the next and then to a memory for the complete rotation. The transfer rate between columns will be resolution-dependent;
  is such that multiple rotations accumulate detections of the same targets points (implicitly supposing an absence of relative movement between the sensor and target);
  is such that the value accumulated for the whole circle could be transferred to the external world (with a limited sensitivity) and still being accumulated with the new detections of photons from the targets pixels. The limiting factor is the relative movement between the sensor and the target. This relative movement could be partially compensated by smart movements of the accumulated data between pixels trough inter-cell exchange, but only up to a certain level of change. The cells should naturally purge the old accumulated data (e.g., sliding window, leaky integrator) after a certain time optimized for the relative movement of the sensor/target, the illumination of the target, the type of targets and its inherent rate of change in pixel values.

Figure 24:
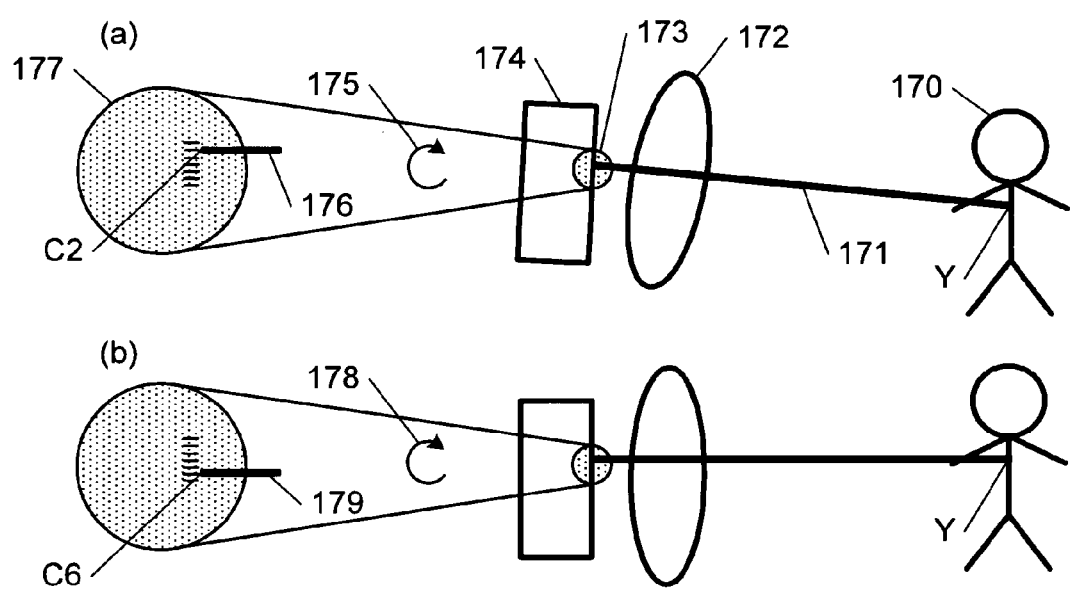
FIG. 24 illustrates a same target pixel detected and accumulated by two different rows of the matrix at two different times and relative angular positions of the sensor and optics.

FIG. 24 illustrates the same target pixel detected and accumulated by two different rows of the matrix at two different times and relative angular positions of the sensor and optics. The imager of that embodiment comprises 2D measurement capabilities of SPAD sensors as described in the prior art. In such an imager, one or more SPAD detector array receives the 2D image from the illuminated scene through an optics which is driven in rotation by a mechanical drive. The optics ensures focus and/or zoom capabilities. It is driven under the control of a controller of the imager such that acquiring of a frame is performed in relation to the illuminating beam from the illuminator of the imager. In a variant, several rotating sensors comprising both a SPAD detector array and a rotating optics ensure the capability to catch various focus distances in the same period of acquiring a frame. The basis of the method to acquire a 2D image relates to the shift of the accumulated photon detections (events at each SPAD detector cell).

In the part (a) of FIG. 24, a first acquisition is started at a given rotation 175 of the optics 172-174 from the center of the circular optical part SPAD detector array 177. From the scene 170 a series of reflected photons has illuminated the scene with any the illuminating device (not shown). A reflected light ray from a target pixel Y passes through a focus optics 172 to the focal point 173 at the receiving optics at the front end of the optical part 174 of the SPAD detector array. The Y address of the target pixel is given by the time-related information of the light pulses in said series of illuminating pulses. It is associated at column 2 (labeled C2 in the drawing) onto the SPAD detector array, and at time 0, which corresponds to the first pulse, or packet of pulses emitted at the illuminator (not shown at FIG. 24). In a given example, 2 photons are accumulated at column 2 C2 of the SPAD detector array 174. Then, in part (b) of FIG. 24, a second acquisition is started by a new series of reflected photons and a new rotation 178 is applied to the image produced by the optics 172-174 onto the circular part of the SPAD detector array. At time 8, 3 other photons are detected from target pixel Y on column 6 (C6 at FIG. 24 (b)). Therefore, at the second acquisition, pixel Y is represented with 2+3=5 photons duly accumulated from time 0 to time 8.

Figure 25:
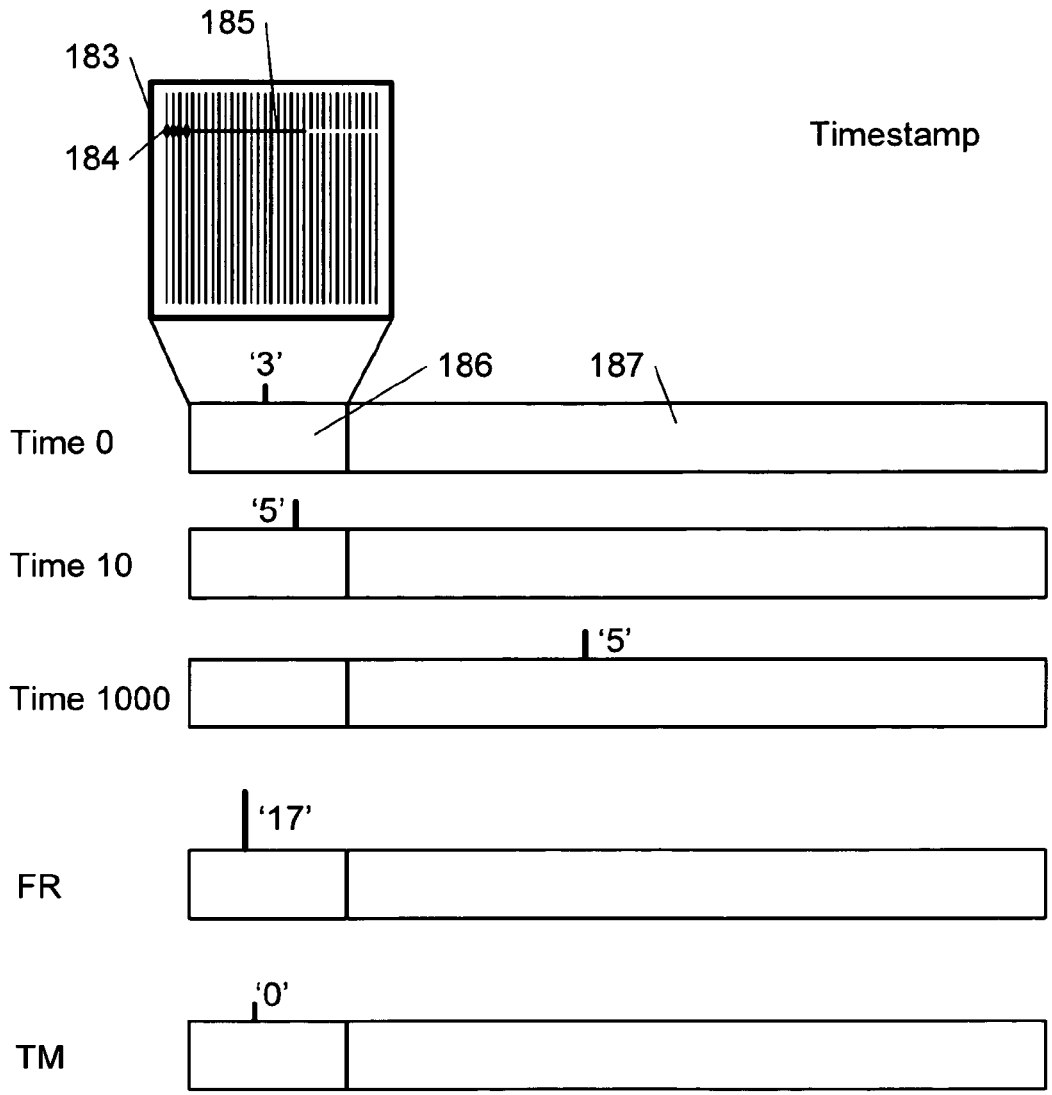
FIG. 25 illustrates target pixel accumulated photons value (analogical 2D) transferred in the non-cell full circle memory and back for another round of accumulation.

FIG. 25 illustrates a strategy in which the accumulated value of photons for a vertical line of target pixels is transferred to a non-cell full circle memory and back for another round of accumulation. In an embodiment of the present invention, the SPAD detector array 183 is rotated around a vertical axis so that a line 185 is described by the homologous dots 184 of a line on the illuminated target.

This strategy uses an input memory for cells leaky memory 186 and a full circle memory 187 having N pads, so that after the N-th loading in the full circle memory, the data returns to the input memory and can be erased. The strategy ensures the following steps as it seen:
  the target pixel '3' is loaded in the input memory at time 0;
  then it is loaded '5' at time 10;
  then it is loaded at time 100 in the full circle memory 187;
  the accumulated target pixel value '17' is back to the input memory after a full rotation FR and others accumulated detection; and
  the target pixel is erased '0' after a large target movement TM.

With such a method, the detected photons are accumulated in the digital domain. While it rotates, all position values are accumulated in the circle memory and averaged with a given weight in the global DSP so that the previously acquired data are averaged with a different weight than the more recent one. When the circle memory reaches its value limits, a reset (or a complete recalculation) is ordered at the global DSP and a new accumulation is instructed.

In another embodiment, the non-imaging matrix sensor part of the SPAD detector array comprises:
  global macro-cells;
  conversely from the prior-art large SPAD matrix by the use of digital instead of analog averaging (better precision);
  Very high capabilities to acquire non-repetitive signal at very high speed (limited by the data throughput of the sensor). Their first use will be the acquisition of limited duration, high frequency, low level light signals. This capability has been provided with SPAD detector matrix before, but was done using analogical, less efficient summation (one digital circuit for the whole SPAD array). The use of individual Time to Digital converter for each SPAD detector cell provides the capability of digital averaging of the measures;
  ready time of individual SPAD. The analogical average of several SPAD avalanche current bring much less resolution and precision;
  a very high speed detection capability, a large detection area while keeping a very good sensitivity;
  mostly use large physical diffusers on top of the detectors;
  a controller dedicated to the received power to reach the maximum speed of acquisition as available (with AGC or not).

In another embodiment, the SPAD sensor array has a matrix form but nevertheless acts like a linear sensor, where diffuser distributes photons in one dimension. Line imaging form factor uses:
  mostly horizontal macro-cells;
  mostly short measurement packets reflected from selectively vertically illuminated lines; therefore, the controller of the illuminating device associated with the SPAD detector array is programmed to generate at least one light line toward the scene;
  mostly specially crafted horizontal physical diffusers on top of the detectors;
  a single-line SPAD detector cell collects the faint light coming back from a single point target. It will be needed to collect these photons on a large array (e.g., 1000 points) with enough speed/resolution (i.e., using 10-GHz pulses) and sensitivity (almost single photon detection, ps-level time resolution);
  No single detector could easily provide these capabilities. The array form factor sensor will use the diffuser to gain a large capability in speed/sensitivity detection at the price of a reduction in horizontal resolution (possibly provided by an external scanning mechanism). It will be able to work with short measurement packets formed of GHz pulses and deliver 3D data with a few ps-level precision;
  Each stacked vertical "pixel" of the array (one out of 1000) will be built with tens to hundreds of real SPADs stacked horizontally. The physical diffuser will dispatch the received photons on this horizontal array (equivalent to a perfect i.e., —recovery-free, single SPAD). For each packet, 1 to hundreds of pulses will be received by the composite "pixel". The first goal of the use of this horizontal form factor is to hugely improve the maximum possible acquisition equivalent frequency of each "pixel" element. The second goal is to hugely improve the final measurement precision on the target point depth. This will be based on the "square root" law. For example, if 9 SPAD's (or equivalents available) each receive 36 pulses from the same 3D target point, the effective resolution (with a jitter of 50 ps) will be improved 18 times ($\sqrt{9}$ times $\sqrt{36}$) to around 3 ps (one millimeter, one way);
  The diffusing mechanism will facilitate the situation that a "non-avalanched" SPAD will be available with certain probability to receive photons aimed at the "pixel" point. This could require a very fast AGC mechanism on the imager to stop the avalanching of all the SPAD elements.

A single SPAD will have to recover before the reception of the next measurement packet 20 ns or so later (assuming a 50 MHz measurement packet frequency).

Figure 26:
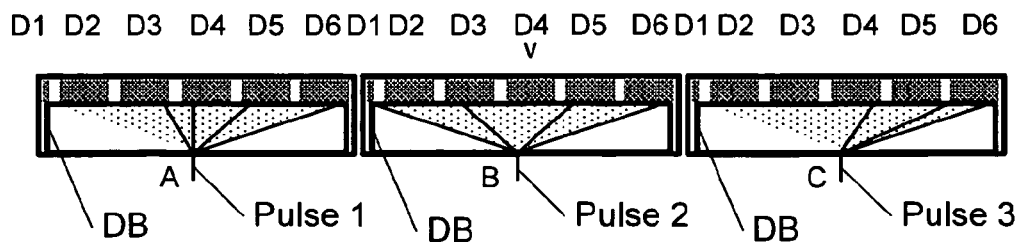
FIG. 26 illustrates detection and filtering of the time/depth value from a single pixel through different pulses diffused on different available or unavailable detectors.

FIG. 26 illustrates a detection/filtering device for the time/depth values from a single pixel through different pulses (pulse_1) to (pulse_3) diffused on different available or unavailable SPAD detector cells (D1-D6). With the help of the ACG mechanism, only an optimum number of detectors are avalanched.

At the diagram (A) in FIG. 26, a pulse labeled pulse_1 is received at the SPAD detector array, arranged as described in FIG. 25. Due to the diffuser bar DB between the focusing optics of the receiving device, pulse_1 is diffused toward the SPADs D3 to D6. A given pixel is associated with a determined focal point. Due to the unavailability of some diodes of the SPAD detector array, at the diagram (B), when a second pulse 2 is received, the diffuser redirects photons to the diodes D1, D2 and D5, D6. At the diagram (C) at the last time, when a third pulse is received, as pulse 3, the diffuser attains the diodes D4 to D6. The sequence follows. Due to the averaging of the events detected at each SPAD detector cell, a signal is progressively enriched.

An ACG mechanism, used by the imager, details of which are not described here, will generally let a few SPADs avalanche together for a single incoming pulse, thus making possible an averaging action between them (multi-cells). The second averaging will be done with the multiple pulses that are part of a single packet. All these pulses will be reflected from the same small area target origin and will then carry the same depth information. The global averaging resulting from the smart filtering of the multi-detectors/multi-pulse data will then be very efficient.

Like the other types of geometrical organization of the sensor, the SPAD line matrix will extensively use hardware and software (filtering) blanking mechanisms: It will use blanking of the entire SPAD matrix to stop SPAD avalanching most of the time. Only small periodic windows of a few nanoseconds will be "open" to receive photons from the target. This will limit the effect of internal (SPAD) and external background noise. This will also limit the effect of the echo from foreground and background obstacles in out-of-focus areas.

Figure 27:
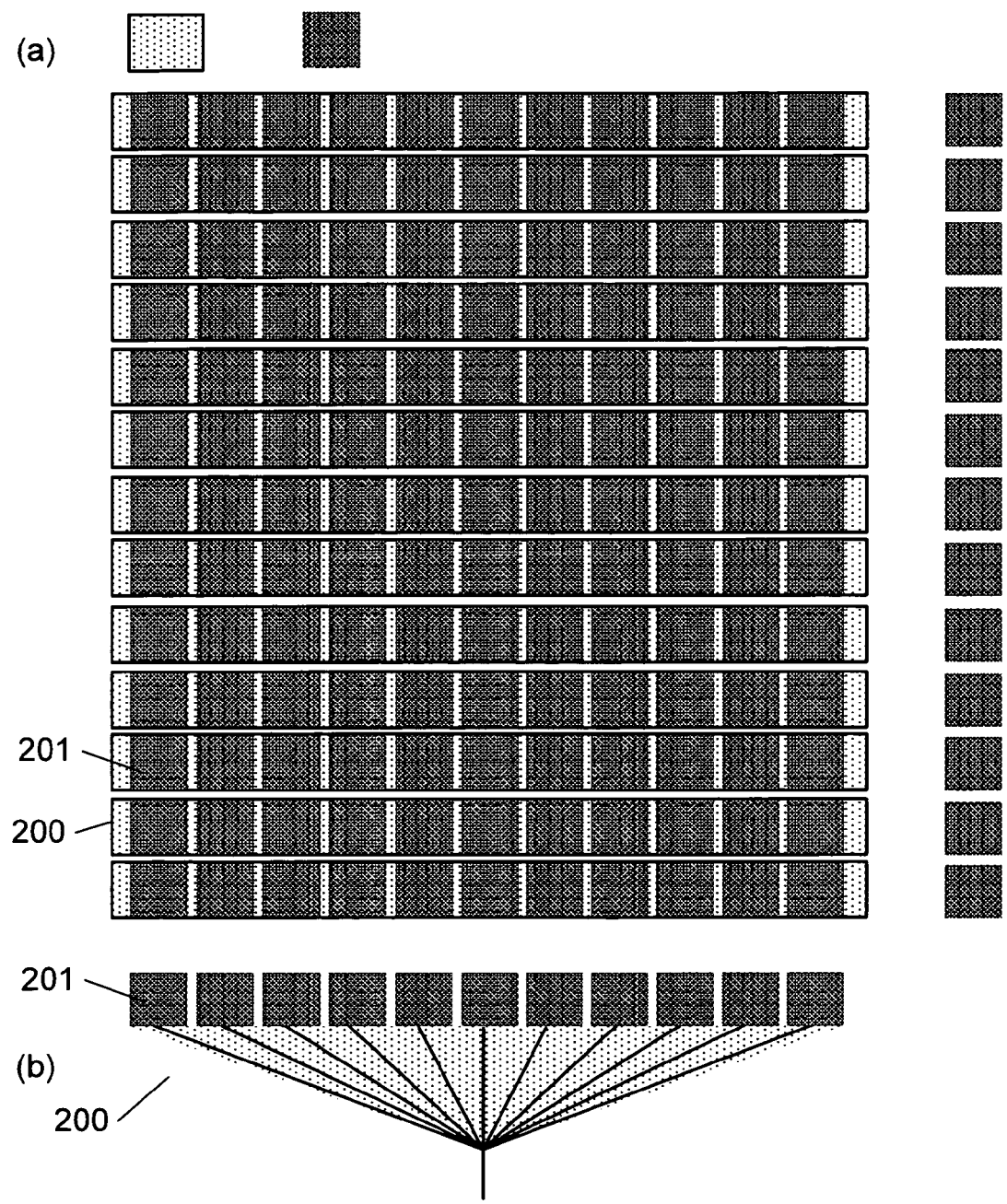
FIG. 27 illustrates the organization of the diffuser and SPAD device.

FIG. 27 illustrates an organization of the diffusers and SPADs. The diffusers are part of the optical components that are provided at the front end of the SPAD detector array. In a part (a) of FIG. 27, they are distributed in the shape of horizontal bars 200 consisting of a transparent but diffusely scattering material. Each horizontal bar of diffusers is situated above an horizontal line of SPAD detector cells 201 in the 2D matrix.

In a part (b) of FIG. 27, a sectional view of part (a) is shown. An optical focal point is formed by other optical parts (not shown) of the front end of the SPAD detector array and its light is spread by the optical diffuser 200 toward a group of SPAD detector cells 200. The result of such a diffusion of photons is to distribute many photons of the same laser pulse onto the multiple SPADs of a line on the SPAD detector array, which is on a 2D form. Therefore, the speed of the detection of multiple events is very high. It results that the N diodes on a line under a linear diffuser will react like a single SPAD with a very fast recovery time, but with a reduced sensitivity.

In another embodiment, a multi-wavelength 3D data capture acceleration strategy is illustrated.

Previous research has been done on the use of multiple wavelengths with SPAD sensors. For example, a multi-wavelength laser ranging system has been developed for detecting and analyzing distributed targets. A distributed target is any object that has more than one surface, i.e. has a depth, like a bottle or box. If an object at long distance is targeted with a laser beam, it is possible to receive light returning from multiple surfaces. This is due to the divergence of the laser beam—in the multi-wavelength system for example, the beam diameter is about 20 cm at a distance of 330 m from the laser aperture. (Source: Infrared Time-Correlated Single-Photon Counting, Ryan Ellis Warburton, p 133. Thesis submitted for the Degree of Doctor of Philosophy Heriot-Watt University School of Engineering and Physical Sciences July 2008.)

The aim of the multi-wavelengths 3D data capture acceleration is not to improve the angles of vision or the reflectivity properties of the targets. It is rather to limit the influence of the recovery time of the SPAD by using wavelength diversity. Such a strategy is defined with a method which comprises step of performing a multi-wavelength strategy comprising:

Emitting at least two separate ultrashort laser pulses at different wavelengths; and Receiving the reflected light pulses at different detectors sensitive to one wavelength, like SPAD detector cells.

Preferably the strategy comprises also a step of synchronizing and/or phase shifting the emission and all the detectors.

A device for the representation of a scene performing such a strategy comprises:

at least an illuminating device of a scene to represent, the illuminating device providing at least a series of ultra short power laser pulses with time-related positions under control of a controller, the illuminating device comprising two laser source of different specific wavelength preferably mode-locked; and at least two detectors, preferably comprising single photon avalanche diode arranged each to detect independently the reflected light of a specific wavelength from a scene from at least said series of ultra short laser pulses of said illuminators.

Figure 28:
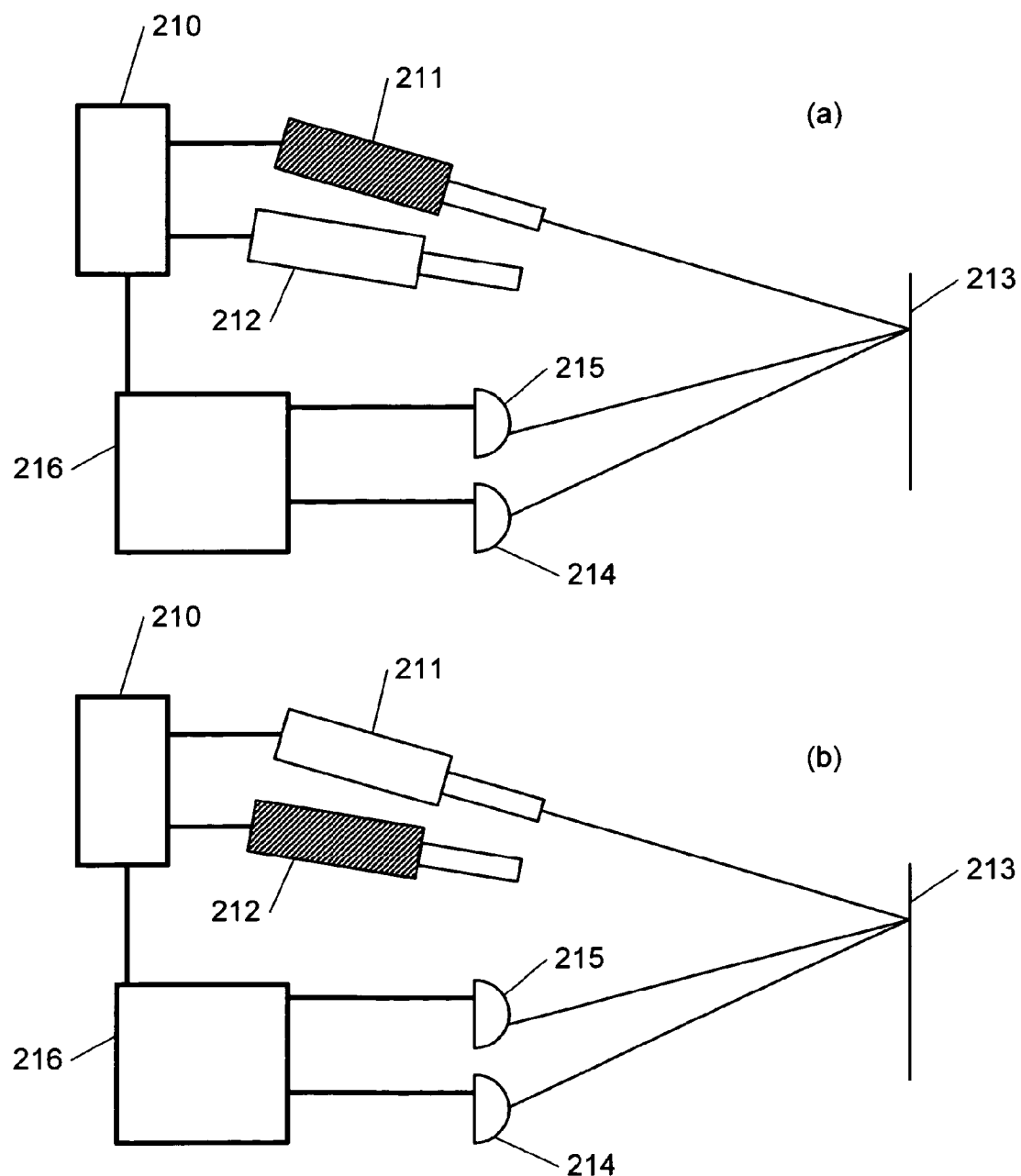
FIG. 28 illustrates a strategy based on a multi-wavelength diversity.

In FIG. 28, a multi-wavelength diversity strategy is illustrated. In such embodiment of the present invention, the illuminating device 210 comprises two separate ultrashort pulse laser sources 211 and 212 operating at two different wavelengths. In an example, laser source works at 1.515 µm and laser source 212 works at 1.530 µm. It also comprises a controller (already described, and not shown) which is provided with resources to generate time-related series of laser pulses toward the scene to be represented. The SPAD detector array of this embodiment comprises for each cell a SPAD detector cell 214 sensitive to the first wavelength and a second SPAD detector cell 215 sensitive to the second wavelength.

The first emitter 211 working at a wavelength of 1.515 µm (for example) sends a pulse to the target 213 that reflects it in the direction of all detectors 214 and 215 of the SPAD detector array. Only the 1.515 µm sensitive detector 214 will avalanche and not the 1.530 µm detector 215. Synchronously but with a phase shift, the 1.530 µm emitter 212 sends a pulse to the target that reflects it to all detectors. Only the 1.530 µm sensitive detector 215 will avalanche and not the 1.515 µm detector (214). In this way, the influence of the recovery time of the SPAD detectors is divided by two. With more emitters/detectors groups more time saving is possible. To be efficient, all emitters/detectors groups should be synchronized and precisely phase related between each other. Several points of view for the emitters/detectors groups are possible. The 3D data should then be synthesized globally at one or several points. The limit to the number of pulses of different wavelength is mainly linked to the total power acceptable by the target (eye sensitivity). If such limit does not exist, complex systems with hundreds of emitters/detectors groups, each one with a different wavelength could be built. Combined with the acceleration capabilities already described, almost unlimited 3D speed acquisition are possible The SPAD diodes are not able to precisely select by themselves the exact wavelength of detection. An external wavelength filtering system, by detector or multi-sensors, provides this filtering.

It is noted that the SPAD is a diode which is able to operate not only in a single photon capturing mode but also as a general Avalanche Photo Diode. Therefore, the SPAD detector cells and the SPAD detector arrays used in the present invention could also be used as APD detectors.

The invention claimed is:

1. A method for producing a representation of a scene by means of a sensor array, comprising:
   illuminating the scene by means of a series of light pulses, wherein an arrival time of each of the light pulses is measured as a timestamp;
   measuring a distance with the scene;
   collecting light reflected or scattered by the scene to at least a single photon avalanche diode (SPAD) sensor array, comprising at least one SPAD detector cell, on the basis of the pulses from said series of light pulses such that a reference time is determined first, and then a time of flight of each event detected at each SPAD detector cell is counted from the determined reference time, the reference time being unique for at least a train of a predetermined series of light pulses; and
   generating one of a 2D or 3D representation of the illuminated scene by processing the electrical signals generated by each SPAD detector cell on the basis of the counted time of flight of the events,
   such that said representation allows to detect movements in the scene and/or to achieve high resolution 2D or 3D images, wherein a time separation between the light pulses is shorter than the time of flight.

2. The method according to claim 1, wherein the timestamp origin is defined by the first pulse of the series of light pulses.

3. The method according to claim 1, wherein the timestamp is a digital word comprising coarse and fine parts, wherein the coarse part is obtained by counting a clock edges and wherein the timestamps are averaged.

4. The method according to claim 1, wherein the received pulses are registered by at least one SPAD detector cell and/or a plurality of said SPAD detector cells at one time or at different times.

5. The method according to according to claim 1, wherein said generating step comprises a selection of at least one of the following steps of:
   using a global timestamp for each detected event on at least a SPAD detector cell on a frame of the pulsed train;
   using a variable number of pulses for each measurement pulse train, that number being optimized considering the speed of measurement and the obtained image resolution while keeping the involved optical energy low enough for obtaining eye safety;
   filtering the events detected at each SPAD detector cell;
   having generated a plurality of packets of a given number of laser pulses, averaging, notably under a square law, the received packets at least upon one SPAD;
   locally close to the SPAD detector, compressing of a time data before further processing;
   generating a clock and power enabling signal on the basis of a first coarse scanning by an illuminating device to activate at least one SPAD detector cell just-in-time, calculated from 3D data previously acquired, for the arrival of a packet of received laser pulses;
   generating a series of laser pulses arranged in tagged packets of pulses and detecting tags on said received light pulses in SPAD detector cells;
   detecting and/or filtering of the time and depth values from at least one pixel of the scene from different pulses diffused toward available SPAD detector cells;
   acquiring the same approximate pixel address in the scene on the basis of at least two wavelengths reaching successively different wavelength-filtered SPAD detectors within a time which is shorter than a single SPAD's recovery time;
   acquiring illuminated lines of the scene;
   acquiring illuminated lines of the scene on a single line focal point, then diffused onto multiple SPAD detector arrays and then accumulating/averaging the detected time-related data to generate a composite pixel in a purely digital way;
   just-in-time powering and clocking of SPAD for power saving.

6. The method according to according to claim 1, wherein it comprises a step of performing a multi-wavelength strategy comprising:
   a. emitting at least two separate laser pulses at different wavelengths; and
   b. receiving the reflected light pulses at different detectors sensitive to one wavelength.

7. A method for making a SPAD detector array to be used in a method for producing a representation of a scene by means of a sensor array and comprising:
   illuminating the scene by means of a series of light pulses, wherein an arrival time of each of the light pulses is measured as a timestamp;
   collecting light reflected or scattered by the scene to at least a single photon avalanche diode (SPAD) sensor array comprising at least one SPAD detector cell, on the basis of the pulses from said predetermined series of light pulses such that a reference time is determined first, and then a time of flight of each event detected at each SPAD detector cell is counted from the determined reference time, the reference time being unique for at least a train of a predetermined series of light pulses; and
   generating one of a 2D or 3D representation of the illuminated scene by processing the electrical signals generated by each SPAD detector cell on the basis of the counted time of flight of the events,
   such that said representation allows to detect movements in the scene and/or to achieve high resolution 2D or 3D images, wherein a time separation between the light pulses is shorter than the time of flight,
   said method for making a SPAD detector array comprising the steps of:
   making a first layer comprising a substrate; and then
   making a second layer comprising a plurality of single SPAD cells and using a semiconductor body, at least some SPAD cells having also local analog and/or timing signal processing and also digital signal processing.

8. The method according to according to claim 7, wherein the step of making a second SPAD detector layer comprises the steps of:

making a first CMOS layer at least partially as the first layer comprising depositing a germanium layer as a semiconductor body by growing a single grain onto a single SPAD cell;

said second SPAD detector layer being formed under a µ-Czochralski method.

9. The method according to according to claim 8, wherein said SPAD cell comprises at least a single photon avalanche diode and the method comprises:

a step of forming a surrounding cathode under the limit of the grain boundary of said Ge layer;

a step of forming a central pad region forming an anode with p+/n+ region at the central hole.

10. The method according to according to claim 9, wherein said central hole has been formed to be a photon detection device by setting its horizontal and/or vertical dimensions to absorb and register a single photon at said wavelength range.

11. The method according to according to claim 8, wherein said SPAD detector cell comprises at least a CMOS transistor formed with:

an gate electrode implemented onto the central hole forming a channel region of said CMOS transistor;

an source electrode formed onto a p+/n+ region at a first side of said channel region; and an drain electrode formed onto a p+/n+ region at a second side of said channel region;

said CMOS transistor belonging to a local digital and/or analog signal processing device built on said SPAD detector cell.

12. A single photon avalanche diode (SPAD) detector array, comprising:

at least a SPAD detector cell having at least a SPAD diode;

an optical diffuser distributing randomly photons on several stacked SPADs detector cells in a line array detector; and at least one of the following devices:
a quenching circuit,
a pulse conditioner,
at least one time-to-digital converter,
a local digital signal processor,
a blanking/filtering circuit controlled by said local digital signal processor,
a statistical processing circuit comprising at least one counter of the detected events at the SPAD diode, and a D-latch and a multiplier connected to an inverse calculus and eventually to a local correcting circuit,
a digital time and/or space averaging circuit,
a digital nonlinear averaging circuit, and
a time/space data compression circuit.

13. The SPAD detector array according to claim 12, wherein it further comprises an optical diffuser combined with several SPADs detector cells in a matrix detector.

14. The SPAD detector array according to claim 12, wherein at least some of the SPAD detector cells are arranged as macrocells, having a macrocell digital signal processor devoted to control and process the events of the associated SPAD detector cells of the macrocell.

15. The SPAD detector array according to claim 12, wherein it comprises a local digital signal processor at the SPAD detector cell level, a local digital signal processor at each group of SPAD detector cell level and at least one digital signal processor at the global level, each level of digital signal processors executing some programs devoted to the detected events or digital data generated at the closest part and to limit the data transfer requirements and means for building on-demand a flexible, local macro-cell.

16. The SPAD detector array according to claim 14, wherein it comprises a local digital signal processor at the SPAD detector cell level, a local digital signal processor at each group of SPAD detector cell level and at least one digital signal processor at the global level, each level of digital signal processors executing some programs devoted to the detected events or digital data generated at the closest part and to limit the data transfer requirements and means for building on-demand a flexible, local macro-cell.

17. A device for the representation of a scene, comprising:

at least an illuminating device of said scene providing at least a series of ultrashort laser pulses having a duration in the range of a few picoseconds with time-related positions under control of a controller, the illuminating device comprising at least a mode-locked laser source connected to an erbium-doped optical fiber amplifier; and at least a single photon avalanche diode detector array arranged to detect the reflected light from a scene from at least said series of ultrashort laser pulses of said illuminator, wherein a reference time is determined, and then a time of flight of each event detected at the detector array is counted from the determined reference time, the reference time being unique for at least a train of a predetermined series of laser pulses, and a time separation between the laser pulses is shorter than the time of flight.

* * * * *